United States Patent
Eyjolfsdottir et al.

(10) Patent No.: US 12,067,080 B2
(45) Date of Patent: *Aug. 20, 2024

(54) METHOD AND SYSTEM FOR GENERATING TRAINING DATA

(71) Applicant: Intrinsic Innovation LLC, Mountain View, CA (US)

(72) Inventors: Eyrun Eyjolfsdottir, Union City, CA (US); Michael Stark, Union City, CA (US); Marco Carra, Union City, CA (US); Manushree Gangwar, Union City, CA (US); Alex Schlegel, Union City, CA (US); Karthikeyan Yuvaraj, Union City, CA (US); Scott Bandy, Union City, CA (US); Peter So, Union City, CA (US); Lucas Whitaker, Union City, CA (US); Sivaramakrishnan Swaminathan, Union City, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 384 days.

This patent is subject to a terminal disclaimer.

(21) Appl. No.: 17/375,356

(22) Filed: Jul. 14, 2021

(65) Prior Publication Data

US 2022/0019852 A1    Jan. 20, 2022

Related U.S. Application Data

(60) Provisional application No. 63/143,414, filed on Jan. 29, 2021, provisional application No. 63/051,816, (Continued)

(51) Int. Cl.
*G06F 18/214* (2023.01)
*G06N 3/08* (2023.01)
(Continued)

(52) U.S. Cl.
CPC ........... *G06F 18/214* (2023.01); *G06N 3/08* (2013.01); *G06N 20/00* (2019.01); *G06T 7/11* (2017.01);
(Continued)

(58) Field of Classification Search
CPC . G06F 18/214; G06T 7/11; G06T 7/70; G06T 15/04; G06T 17/20; G06T 17/205;
(Continued)

(56) References Cited

U.S. PATENT DOCUMENTS

| | | | |
|---|---|---|---|
| 6,266,062 B1 * | 7/2001 | Rivara | G06T 17/20 345/419 |
| 8,837,839 B1 | 9/2014 | Huber et al. | |

(Continued)

FOREIGN PATENT DOCUMENTS

EP    3405910 B1    11/2020

OTHER PUBLICATIONS

Cheung (Shape-From-Silhouette Across Time), The Robotics Institute, Carnegie Mellon University, 51 pages (Year: 2005).*

(Continued)

*Primary Examiner* — Phuc N Doan
(74) *Attorney, Agent, or Firm* — Fish & Richardson P.C.

(57) ABSTRACT

A method for generating training data can include: determining a set of images; determining a set of masks based on the images; determining a first mesh based on the set of masks; optionally determining a refined mesh by recomputing the first mesh; optionally determining one or more faces of the refined mesh; optionally adding one or more keypoints to the refined mesh; optionally determining a material property set for the object; optionally generating a full object mesh; determining one or more scenes; optionally determining training data based on the one or more scenes; optionally training one or more object detectors using the training data;

(Continued)

and detecting one or more objects using the trained object detector.

22 Claims, 13 Drawing Sheets

Related U.S. Application Data filed on Jul. 14, 2020, provisional application No. 63/051,872, filed on Jul. 14, 2020, provisional application No. 63/051,867, filed on Jul. 14, 2020.

(51) Int. Cl.

| | |
|---|---|
| *G06N 20/00* | (2019.01) |
| *G06T 7/11* | (2017.01) |
| *G06T 7/70* | (2017.01) |
| *G06T 15/04* | (2011.01) |
| *G06T 17/20* | (2006.01) |
| *G06T 19/20* | (2011.01) |
| *G06V 10/141* | (2022.01) |
| *G06V 10/46* | (2022.01) |
| *G06V 20/10* | (2022.01) |
| *H04N 23/56* | (2023.01) |
| *H04N 23/695* | (2023.01) |

(52) U.S. Cl.
CPC ............... *G06T 7/70* (2017.01); *G06T 15/04* (2013.01); *G06T 17/20* (2013.01); *G06T 17/205* (2013.01); *G06T 19/20* (2013.01); *G06V 10/141* (2022.01); *G06V 10/462* (2022.01); *G06V 20/10* (2022.01); *H04N 23/56* (2023.01); *H04N 23/695* (2023.01); *G06T 2207/10028* (2013.01); *G06T 2219/2004* (2013.01)

(58) Field of Classification Search
CPC ........... G06T 19/20; G06T 2207/10028; G06T 2219/2004; G06N 20/00; G06N 3/08; G06V 10/141; G06V 10/462; G06V 20/10; H04N 23/695; H04N 23/56
See application file for complete search history.

(56) References Cited

U.S. PATENT DOCUMENTS

| | | | |
|---|---|---|---|
| 9,373,085 B1 | 6/2016 | George et al. | |
| 9,659,408 B2* | 5/2017 | Robert | .................... G06T 17/20 |
| 10,185,914 B2 | 1/2019 | Stone et al. | |
| 10,824,923 B1 | 11/2020 | Forster | |
| 10,950,043 B1 | 3/2021 | Hillesland et al. | |
| 11,541,534 B2* | 1/2023 | Ku | ........................ G06N 3/045 |
| 2013/0060654 A1* | 3/2013 | Harvill | ............... G06Q 30/0601 |
| | | | 705/26.5 |
| 2013/0202213 A1* | 8/2013 | Adamek | .............. G06V 10/464 |
| | | | 382/201 |
| 2017/0236037 A1* | 8/2017 | Rhoads | ............... G06F 16/5866 |
| | | | 382/103 |
| 2018/0025496 A1* | 1/2018 | Lindner | .................. G06T 17/00 |
| | | | 382/154 |
| 2019/0005711 A1* | 1/2019 | Marin | ..................... G06V 10/75 |
| 2019/0147221 A1 | 5/2019 | Grabner et al. | |
| 2019/0158549 A1* | 5/2019 | Miller | ..................... G06F 3/017 |
| 2020/0061811 A1 | 2/2020 | Iqbal et al. | |
| 2020/0098162 A1* | 3/2020 | Yago Vicente | ....... G06T 15/205 |
| 2020/0164505 A1 | 5/2020 | Boer et al. | |
| 2020/0349764 A1 | 11/2020 | Cappello et al. | |
| 2020/0361083 A1 | 11/2020 | Mousavian et al. | |
| 2020/0368616 A1 | 11/2020 | Delamont | |
| 2021/0023720 A1 | 1/2021 | Du et al. | |
| 2023/0100238 A1* | 3/2023 | Kobori | ...................... G06T 7/73 |
| | | | 382/154 |

OTHER PUBLICATIONS

Moreno, Pol , et al., "Overcoming Occlusion with Inverse Graphics", Springer International Publishing Switzerland 2016.

Buls, Elvijs , et al., "Generation of Synthetic Training Data for Object Detection in Piles", Eleventh International Conference on Machine Vision (ICMV 2018), Proc. of SPIE vol. 11041 2019.

Goldman, Dan B., et al., "Shape and Spatially-Varying BRDFs From Photometric Stereo", IEEE Transactions on Pattern Analysis and Machine Intelligence, vol. 32, No. 6, pp. 1060-1071, Jun. 2010, doi: 10.1109/TPAMI.2009.102.

Hughes, David M., "Enhancing Object Detection Models Via Synthetic Datasets", A Thesis Presented to the Faculty of California State Polytechnic University, Pomona, 2020.

Jaiswal, Ayush , et al., "Keypoints-aware Object Detection", Pre-registration workshop NeurIPS (2020), Vancouver, Canada.

Krainin, Michael , et al., "Manipulator and Object Tracking for In-Hand 3D Object Modeling", Sage Journals, vol. 30, Issue 11, 2011, Research Article, Jul. 7, 2011.

Lawrence, Jason , et al., "Inverse Shade Trees for Non-Parametric Material Representation and Editing", ACM Transactions on Graphics (Proc. SIGGRAPH), Jul. 2006.

Wong, Matthew Z., et al., "Synthetic dataset generation for object-to-model deep learning in industrial applications", PeerJ Computer Science, Oct. 14, 2019.

Zeng, Andy , et al., "TossingBot: Learning to Throw Arbitrary Objects with Residual Physics", IEEE Transaction on Robotics, arXiv:1903.11239v3, May 30, 2020.

International Preliminary Report on Patentability in International Appln. No. PCT/US2021/041553, mailed on Jan. 26, 2023, 8 pages.

International Search Report and Written Opinion in International Appln. No. PCT/US2021/041553, mailed on Dec. 23, 2021, 11 pages.

\* cited by examiner

METHOD AND SYSTEM FOR GENERATING TRAINING DATA

CROSS-REFERENCE TO RELATED APPLICATIONS

This application claims the benefit of U.S. Provisional Application No. 63/051,816, filed Jul. 14, 2020, U.S. Provisional Application No. 63/051,867, filed Jul. 14, 2020, U.S. Provisional Application No. 63/051,872, filed on Jul. 14, 2020, and U.S. Provisional Application No. 63/143,414, filed Jan. 29, 2021, each of which is incorporated in its entirety by this reference.

TECHNICAL FIELD

This invention relates generally to the computer vision field, and more specifically to a new and useful method for generating training data.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
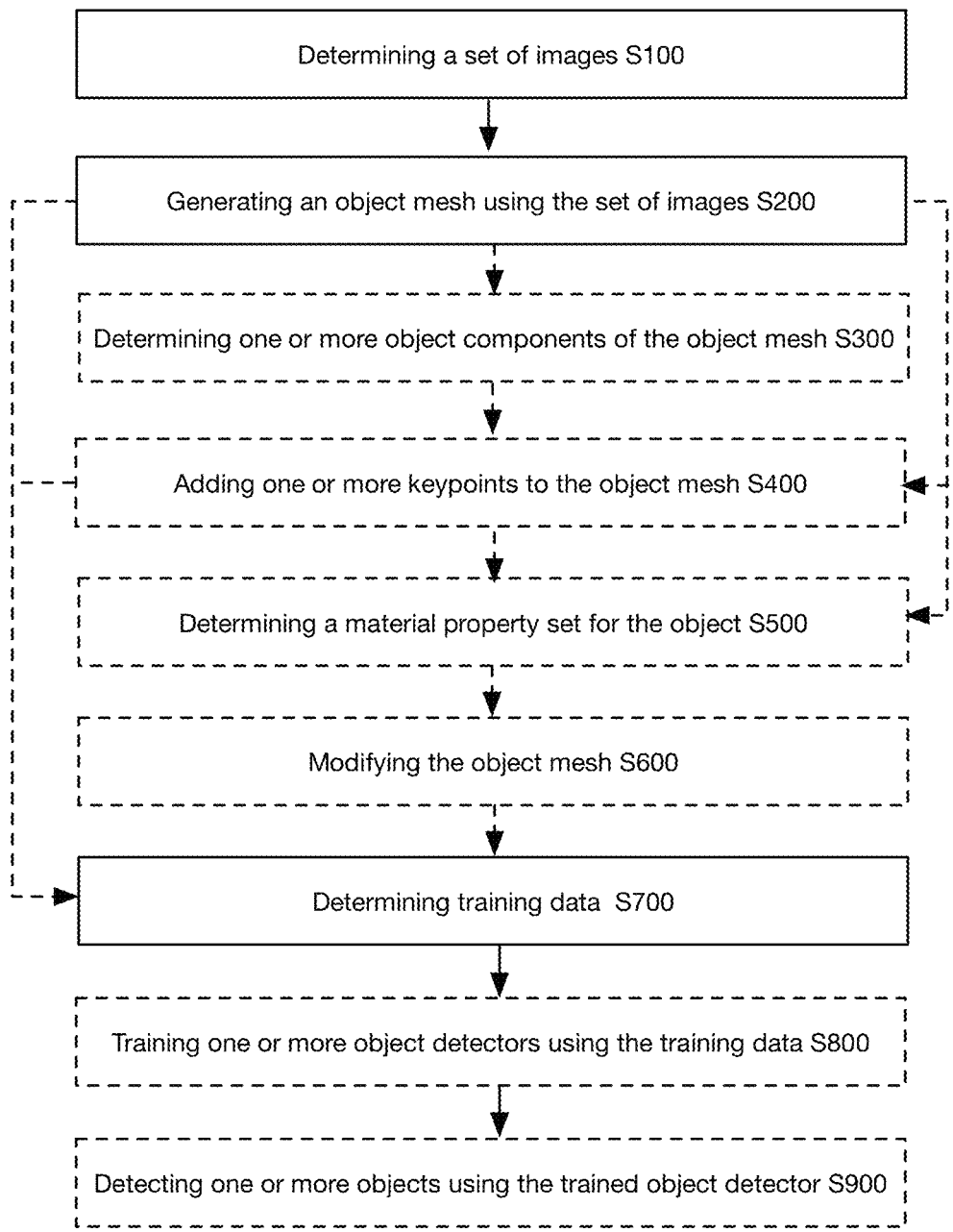
FIG. 1 is a schematic representation of a variant of the method.

As shown in FIG. 1, the method for training data generation can include: determining a set of images S100; generating an object mesh using the set of images S200; optionally determining one or more object components of the refined mesh S300; optionally adding one or more keypoints to the object mesh S400; optionally determining a material property set for the object S500; optionally modifying the object mesh Shoo; determining training data S700; optionally training one or more object detectors using the training data S800; detecting one or more objects using the trained object detector S900; and/or any other suitable elements.

The method functions to generate synthetic training data to identify individual instances of previously-unknown objects in unstructured scenes. This synthetic training data can optionally be used to train one or more object detectors to identify robotic grasping points, identify graspable faces, and/or select a grasping point on one or more individual object instances.

2. Examples

In a first example, the method for training data generation can include: determining a set of images for an object, wherein the set of images includes RGB images and depth images; generating an object mesh using the set of images; determining object components (e.g., object face, object part, etc.) based on a bounding box and/or local features of the object; adding one or more keypoints to each object component of the object mesh and/or tagging mesh faces, wherein each keypoint is associated with an object face identifier for the respective object component; determining a material property set for the object, wherein the material property set includes scores for surface properties (e.g., shininess, transparency, color, texture, etc.); optionally modifying the object mesh based on the material property set and/or the set of images; determining one or more virtual scenes using the object mesh, wherein the object mesh can be the full object mesh (e.g., 360 degree view of the object) or include multiple meshes for different sides of the object (e.g., wherein determining virtual scenes can include tracking gravity vectors to make sure that known surfaces are visible to virtual cameras); determining training data (e.g., rendering synthetic images that depict object instances using the set of images and the material property set, wherein each object instance is associated with unoccluded object keypoints) based on the one or more virtual scenes; training one or more object detectors for object grasping using the training data; using the trained object detectors to detect the object keypoints in a physical scene (e.g., detect nonoccluded object keypoints, nonoccluded object faces, etc.); and grasping objects at the keypoints using the robotic arm and end effector.

Figure 12:
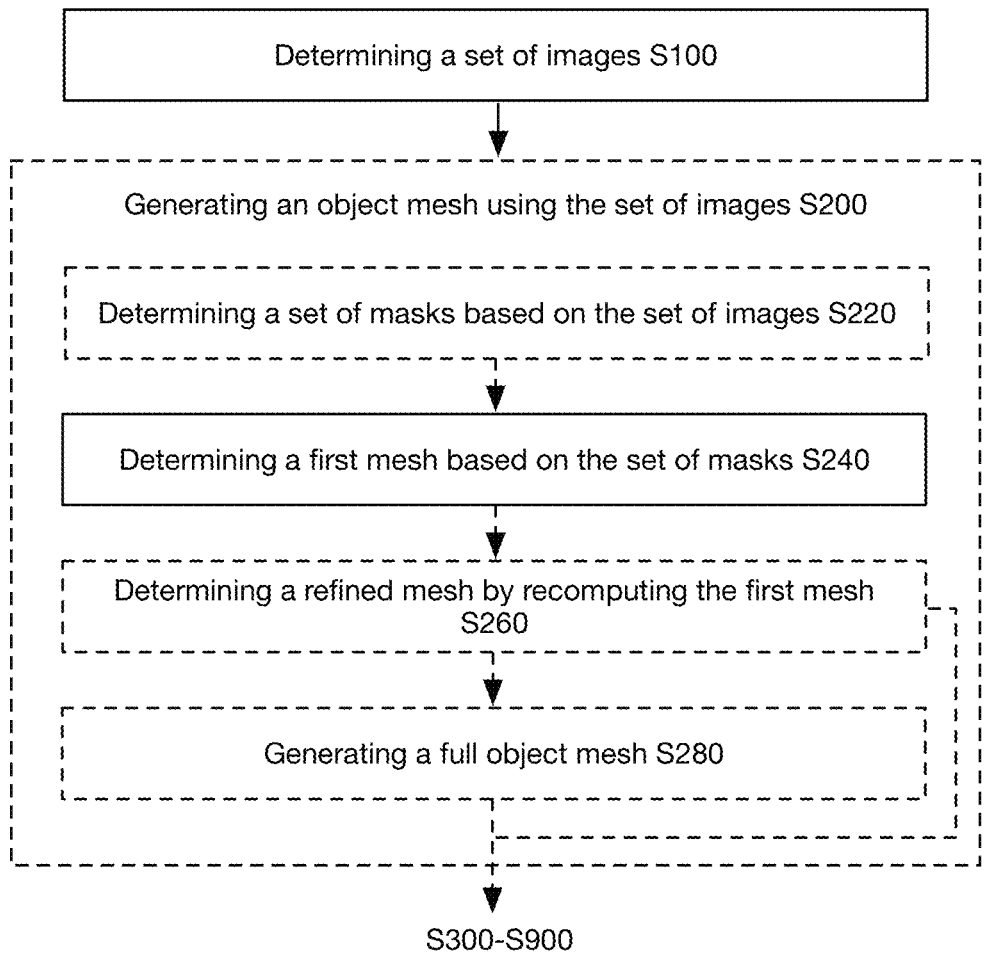
FIG. 12 depicts an embodiment of the method.

In a first specific example (e.g., as depicted in FIG. 12), the images can be determined using an image capture environment that includes: a housing defining an enclosed measurement volume; a rotating pedestal mounted to the housing within the measurement volume and configured to support an object in the measurement volume; one or more calibration features, wherein a calibration feature can be mounted to each side (or subset thereof) of the pedestal; an imaging system configured to capture the set of images; an imaging system actuator mounting the imaging system and configured to move the camera along a predefined trajectory relative to the support; and a plurality of light emitting elements mounted to the housing, wherein the light emitting elements are evenly distributed about the interior of the housing.

In a second specific example, generating the object mesh using the set of images can include: determining a set of masks based on the images, wherein each mask includes the object segmented from the rest of the image; determining a refined mesh based on the set of masks and the depth images using visual hull carving and/or depth fusion; further refining the refined mesh using one or more smoothing techniques, and after smoothing, further refining the mesh using the set of masks; optionally generating a full object mesh by aligning multiple refined meshes of the same object.

3. Benefits

Variants of the system and method can confer several benefits over conventional systems.

Figure 10A:
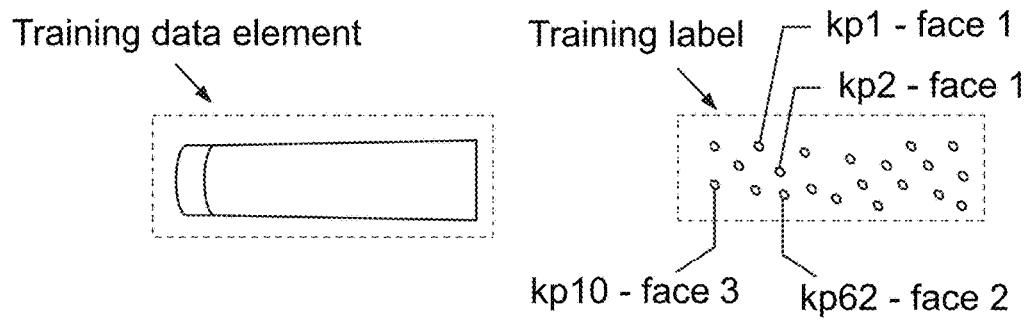
FIGS. 10A and 10B depict examples of S700.
Figure 10B:
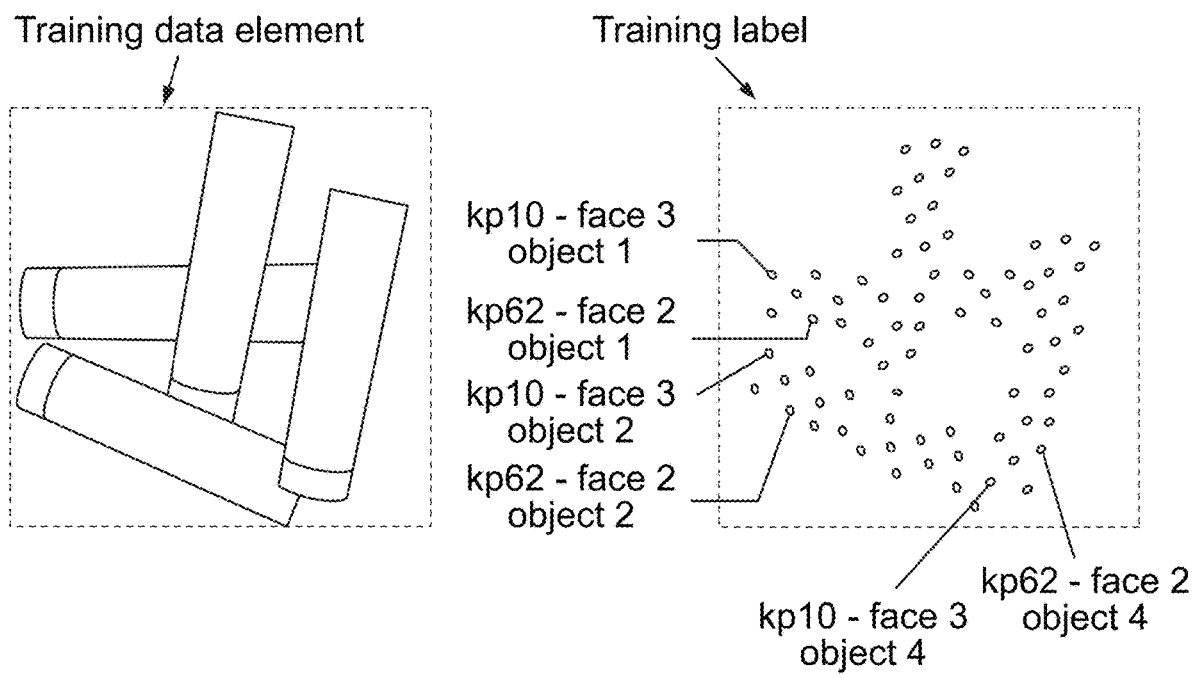

First, variants of the system and method can provide training data including unstructured piles of objects (e.g., the same object, different objects, etc.). The training data can include a synthetic image and a training label (or training target), wherein the training label can include unoccluded object keypoints for each unoccluded section of an object that is visible (e.g., that is in a virtual camera field of view) in the synthetic image (e.g., as depicted in FIGS. 10A and 10B).

Second, variants of the system and method can provide accurate training data (e.g., with accurate object segments, keypoints, and labels) for training one or more object detectors. This accurate training data can be generated using geometrically accurate object meshes, which can also be generated by the system and method. In variants, these geometrically accurate object meshes (and/or accurate geometric models) can be generated without complex geometric scans or CAD models, and can be generated on-premises for unknown objects (e.g., using only 2D images and optionally depth measurements). The accuracy of the object mesh can influence the accuracy of the one or more object detectors to identify an object in a pile and successfully execute an object grasp, so high-accuracy meshes can be desirable in some applications. In variants, accurate object meshes can be automatically generated by both extracting convex and concave object surfaces from images and depth maps by using a combination of visual hull carving, depth fusion algorithms. In these variants, accurate masks, generated by using a combination of depth integration and image segmentation techniques, can be used to crop images and/or depth maps used by the visual hull carving and depth fusion algorithms to increase the accuracy of the resultant object mesh. Variants of the system and method can optionally determine accurate meshes for transparent and/or reflective objects, which are conventionally difficult to model from images.

Third, variants of the system and method can add keypoints and/or object component identifiers to object meshes, such that when the training data is generated, objects depicted in the training data can be labelled with the keypoints and optionally, the object component identifiers. The object component identifiers can be individual object faces and/or components (e.g., cap, body, arm, head, leg, etc.). The object detectors can be trained to identify said keypoints, which can be used to determine a grasp for the object during inference.

Fourth, variants of the technology can provide a scalable system and/or method that can automatically generate the object meshes, identify graspable faces, generate training data, and train object recognition networks without manual input (e.g., without humans in the loop). This allows for users without any machine learning expertise to easily add new objects to an object recognition repository and/or reconfigure a packing line to identify new objects.

However, variants of the system and method can confer any other suitable benefits.

4. System

Figure 2:
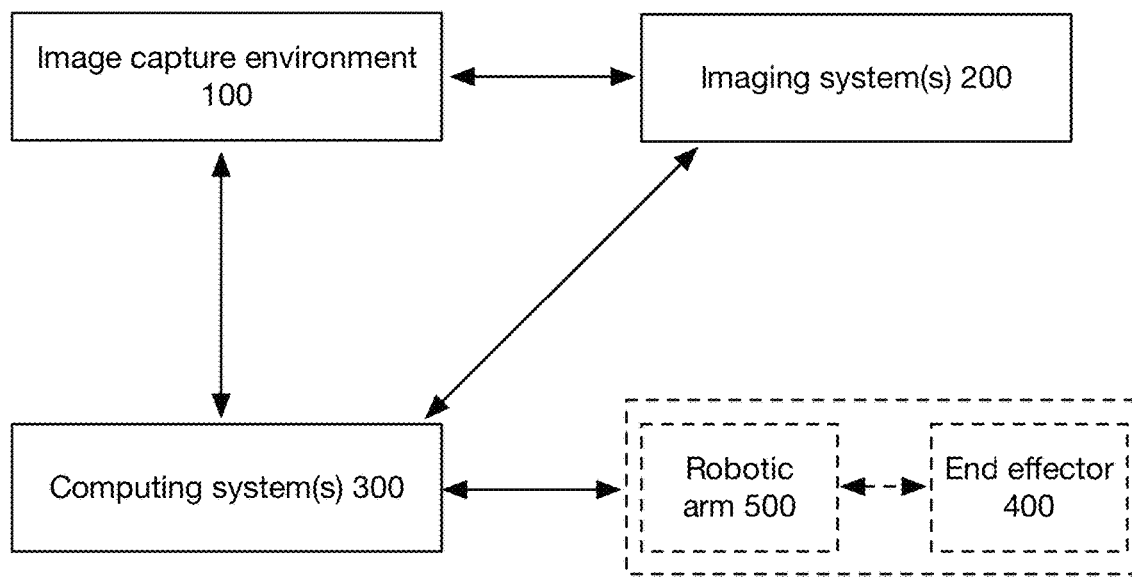
FIG. 2 is a schematic representation of a variant of the system.

The method is preferably performed using the system 20, as shown in FIG. 2, including: an image capture environment 100, one or more imaging systems 200, a computing system 300, an end effector 400, a robotic arm 500, and/or any other suitable components. However, the method can be performed by any other suitable system.

The image capture environment can define a controlled environment for image capture of objects. The image capture environment can include a measurement volume, a housing, one or more light emitting elements, one or more imaging systems, one or more imaging system actuators, a pedestal, one or more calibration features, and/or any other suitable components.

The image capture environment preferably includes a housing, but can additionally or alternatively not include a housing (e.g., be an open space). The housing can be: a spherical segment (e.g., hemisphere), cylindrical (e.g., with an axis perpendicular gravity), prismatic, and/or have other geometry. The housing can be defined by a set of walls (e.g., top, base, lateral sides, back, etc.) surrounding the measurement volume, or not be defined by walls (e.g., be an open space). The walls are preferably radiused (curved, such as concave or convex toward the measurement volume). However, the walls can be wavy, planar and meet at perpendicular junctions (corners), or have any other suitable configuration. The walls can be made of metal, plastic glass, ceramic, or any other suitable material or combination thereof. The walls can have an anti-reflective coating (e.g., matte finish), be reflective, or have other material properties. The walls can be white, black, or have any other suitable color. The walls can have one or more openings, wherein the opening can accommodate placement of an object within the housing. The opening can be half of a wall, a third of a wall, a quarter of a wall, and/or any other suitable fraction of one or more walls. The opening can be on a top wall, lateral side walls, a back wall, and/or any other suitable wall. However, the housing can be otherwise defined.

Figure 6:
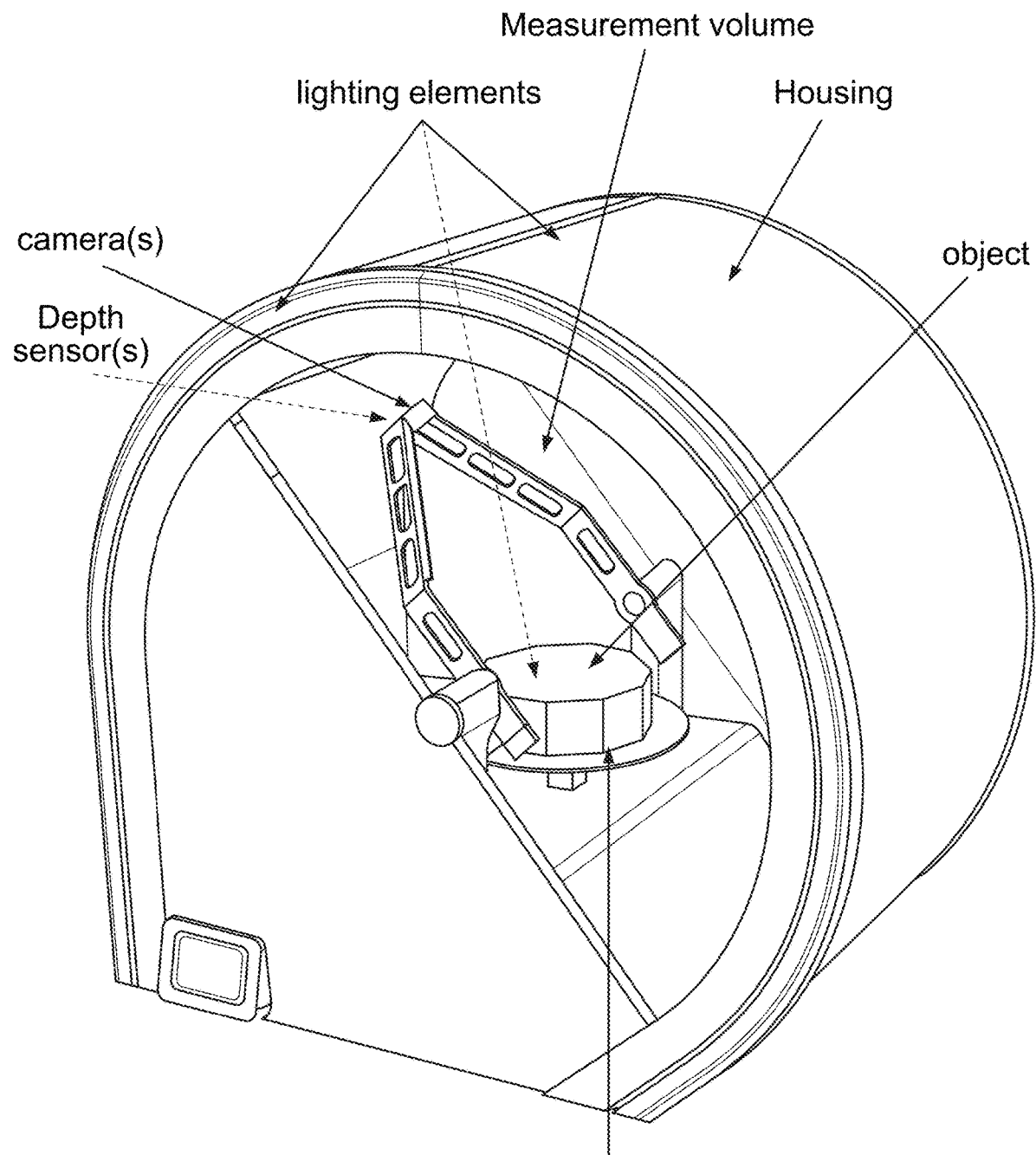
FIG. 6 depicts an example of the system.

The measurement volume (e.g., which can be defined by the housing) can function to provide a volume to sample images of an object (e.g., as depicted in FIG. 6). The measurement volume can be back lit, front lit, fully lit (e.g., from at least two or more opposing and/or adjacent sides), and/or otherwise illuminated by the light emitting elements. The measurement volume can define a coordinate system. The coordinate system can be relative to: a middle of the object support (e.g., pedestal), the center of the measurement volume, a camera (e.g., wherein the coordinate system moves with the camera), and/or any other suitable reference point. In a first variant, the measurement volume can be an open volume. In a second variant, the measurement volume can be an enclosed volume, defined by the housing. However, the measurement volume can be otherwise configured.

Figure 7:
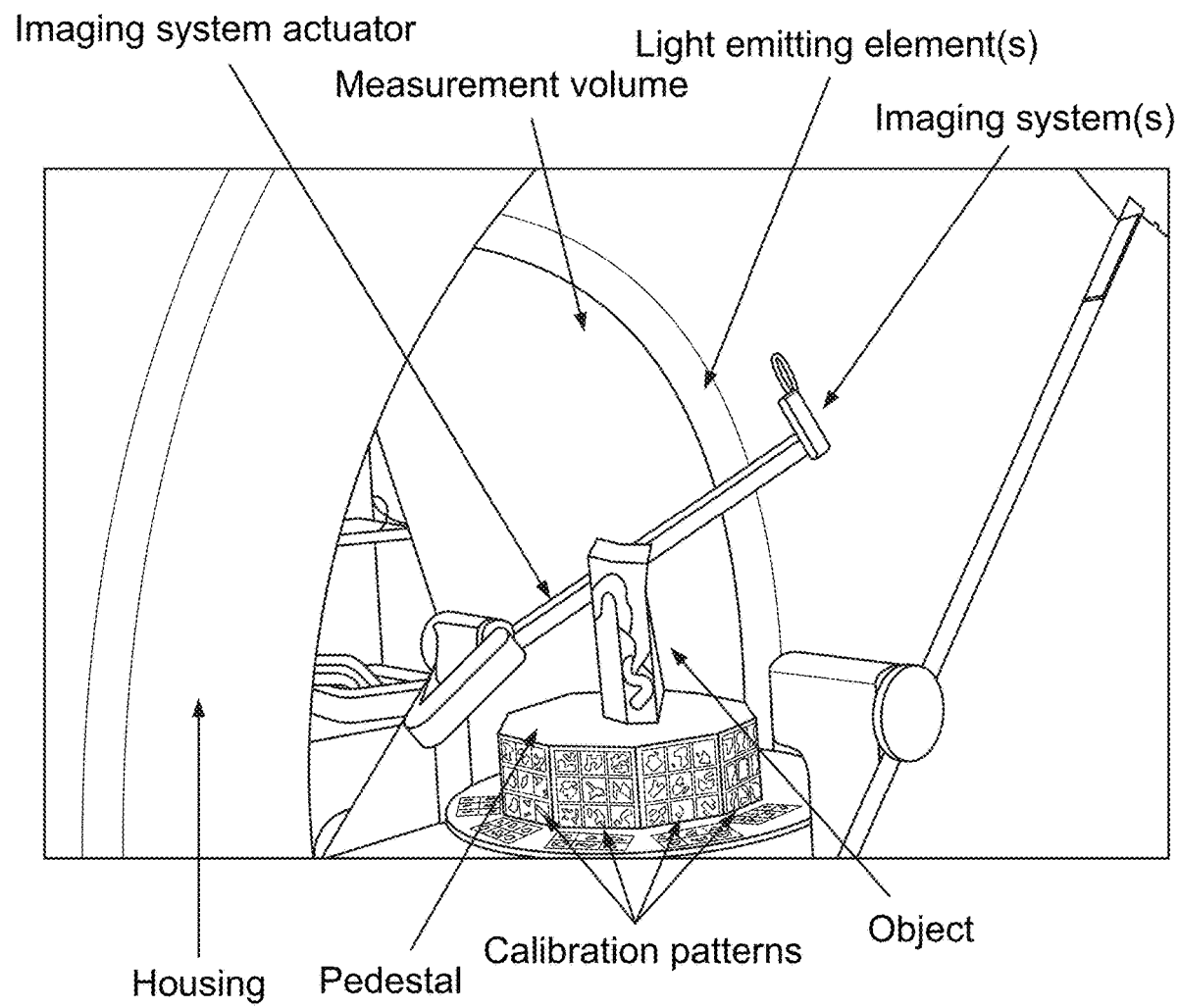
FIG. 7 depicts an example of the system.

The pedestal can function to support the object in the measurement volume (e.g., as depicted in FIG. 7). The pedestal preferably actuates relative to the camera, the measurement volume, and/or any other suitable system component, but can additionally or alternatively be static. The pedestal preferably rotates (e.g., such that the camera can capture a 360 degree view of the object), but can alternatively linearly translate (e.g., along the x, y, and/or z axes), or otherwise actuate. The pedestal can include one or more surfaces (e.g., a top plane, bottom plane, front plane, back plane, side plane(s), etc.). The pedestal can have any suitable geometry, such as the cross section of the pedestal can be a: triangle, square, rectangle, pentagon, hexagon, heptagon, octagon, 9-sided polygon, decagon, and/or any other suitable shape. Each side or a subset thereof of the pedestal (e.g., top, vertical side, etc.) can include one or more calibration features, or not include a calibration feature. The pedestal preferably includes a top plane, wherein the object can be placed on the top plane for image capture. The pedestal can be mounted to the bottom, top, side, and/or other portion of the housing or measurement volume. In variants, the pedestal can be: a column, an arm, and/or any other suitable support. The pedestal can optionally include a weight sensor (e.g., load cell, etc.) configured to measure the weight or mass of the object. However, the pedestal can be otherwise configured.

The calibration feature can function to enable camera calibration, image alignment, object pose identification, and/or any other functionality. The calibration feature can be positioned on the one or more surfaces of the pedestal, on a surface that supports the pedestal (e.g., as depicted in FIG. 7), on the housing, and/or in any other suitable location in the image capture environment. The calibration feature can include: aruco markers, chessboard, charuco markers, halcon pattern, and/or any other suitable fiducial or calibration pattern. However, the calibration feature can be otherwise configured.

The one or more light emitting elements can function to illuminate (e.g., front-light, back-light, etc.) the measurement volume and/or object during image capture. The light emitting elements can be point lights, diffused lights, and/or any other suitable light type. The light emitting elements can emit light having constant color temperature, saturation, color, or any other suitable lighting parameter. The lighting parameters can be constant or be adjustable (e.g., by the processing system, etc.). The lights can emit white light (e.g., cool white light, warm white light, etc.), light in the visible spectrum, IR light, UV light, multispectral light, hyperspectral light, or light having any other suitable wavelength. The light emitting elements can be: light emitting diodes (e.g., gallium arsenide, gallium arsenide phosphide, aluminum gallium arsenide phosphide, gallium phosphide, aluminum gallium phosphide, etc.), filament lamps, discharge lights, fluorescent lights, and/or any other suitable light emitting element. The light emitting elements can be evenly distributed, unevenly distributed, and/or otherwise distributed about the measurement volume. The light emitting elements can be arranged in a pattern: a bar, an arc, hemisphere, randomly, ring (e.g., about an imaging system), and/or arranged in any other suitable pattern.

The one or more light emitting elements can be arranged in light sets (e.g., a pattern, line, shape, etc.). The light sets can be indexed and controllable, or be controlled as a unitary population. A light set can include one or more lights. Light sets can overlap (e.g., share lights) or not overlap. Light sets can be arranged: on the pedestal (e.g., top, sides, within pedestal, etc.), on the housing interior, on an actuatable bar (e.g., imaging system actuator or separate bar), about the imaging system, and/or otherwise arranged. The light sets can be arranged such that the lights emit light from the behind or beneath the object and/or pedestal relative to the imaging system, such that the object and/or pedestal occludes light. The light sets can include a front set, a back set, a top set, a bottom set, left set, right set, and/or any other suitable set (e.g., relative to the measurement volume, relative to the pedestal, relative to the camera, etc.). The light sets can be arranged equidistant to the pedestal, different distances from the pedestal, or otherwise arranged relative to the pedestal (e.g., equidistant, different distances, etc.). The light emitting elements can be mounted: to the housing (e.g., interior thereof), the measurement volume, the imaging system support or actuator, the pedestal, and/or to any other suitable component. The light sets can be mounted to the top, bottom, left, right, back, front, interior, and/or exterior of the mounting component. In a first variant, the light emitting elements can be mounted to the housing interior (e.g., entire interior surface, arcuate strip, point lights, etc.). In a second variant, the light emitting elements can be mounted to a bar (e.g., arcuate bar) that moves relative to the pedestal. In a third variant, the light emitting elements can be mounted to the pedestal. However, the light emitting elements can be otherwise configured.

The imaging system can function to capture images of the object. The images can be: RGB, multispectral, hyperspectral, images in a predetermined set of wavelengths, greyscale, depth, and/or any other suitable image. The imaging system can include one or more cameras, one or more depth sensors, and/or any other suitable imaging sensors. The imaging system can be statically mounted (e.g., to an imaging system actuator, to the housing, etc.) relative to the measurement volume, be actuatable to the measurement volume, or otherwise mounted relative to the measurement volume. The imaging system is preferably mounted to an imaging system actuator, but can additionally or alternatively be mounted to the interior of the housing, to an imaging system actuator, to the pedestal, and/or to any other suitable surface.

Figure 5:
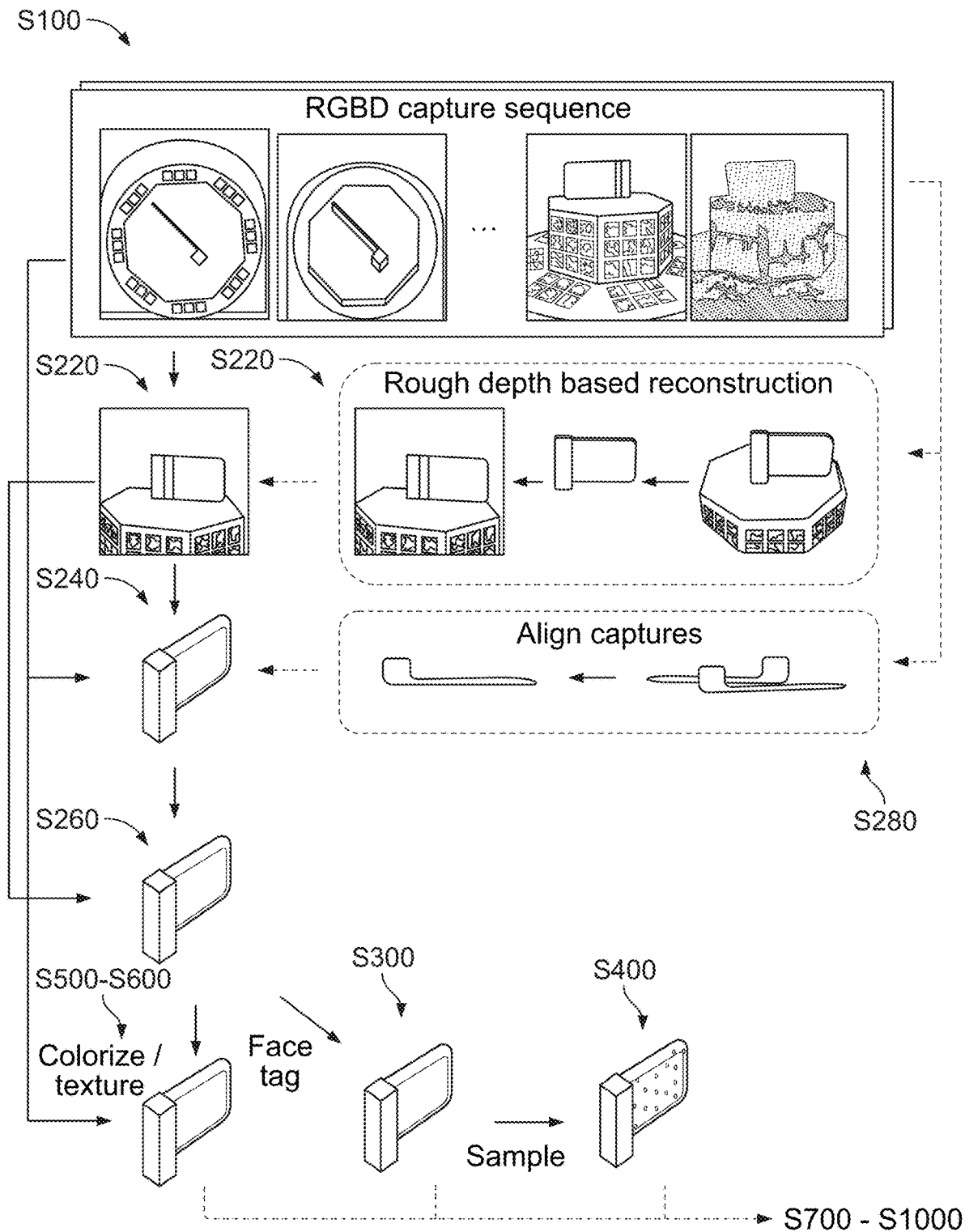
FIG. 5 depicts an embodiment of the method.

The camera can be: a stereo camera pair, CCD, CMOS, RGB-D, and/or any other suitable camera. The one or more cameras can be evenly or unevenly distributed within the measurement volume. When the camera actuates, the imaging system actuator can be the same as the bar that the lights are mounted to, be a robotic arm, and/or any other suitable actuator. In a first variant, the one or more cameras can be mounted to the housing. In a second variant, the one or more cameras can be mounted to an imaging system actuator that moves relative to the housing, relative to the pedestal, and/or relative to any other system component (e.g., examples are depicted in FIGS. 5 and 6). In a specific example, the camera(s) can be mounted to an arcuate arm that sweeps between the front and the back (or between the left and right) of the pedestal and/or object. However, the camera can be otherwise configured.

The depth sensor can function to determine depth measurements (e.g., depth maps) associated with the images captured by the camera. The depth map can be pixel-aligned with the RGB images, or be misaligned. The depth sensor can be an IR camera, ToF system, structured light system, projected light system, and/or any other depth sensor. The depth sensor can be calibrated to create a mapping between the depth measurement and an image pixel, an image captured by the camera, and/or otherwise calibrated. The depth sensor can be collocated with the camera, not collocated with the camera, or alternatively, the depth sensor can be the camera (e.g., wherein the camera is an RGB-D camera). However, the depth sensor can be otherwise configured.

The imaging system is preferably mounted to an imaging system actuator that functions to move the camera within the measurement volume relative to the pedestal. The imaging system actuator can actuate the imaging system to capture a plurality of views of the object, wherein the plurality of views cooperatively form a photo dome or photosphere of the object (e.g., inverse photosphere, inverse photosphere, photodome or photosphere depicting more than a threshold proportion or angular region of the exterior of the object, etc.). The imaging system actuator can be: an arcuate bar, beam, boom, and/or any other suitable structure. The imaging system actuator can include a motor and/or any other suitable components. The imaging system actuator can include one or more joints or not include joints. The imaging system actuator can be mounted to the interior of the housing, mounted to the pedestal (e.g., side of the pedestal), and/or otherwise mounted to the image capture environment. The imaging system actuator can be: plastic, metal, wood, and/or any other suitable material. However, the imaging system actuator can be otherwise configured.

In a first example, the system includes a housing defining an arcuate enclosed measurement volume, a rotary pedestal arranged within the measurement volume and configured to receive an object thereon, an optical system (e.g., including a color camera and/or a depth sensor) mounted to an actuatable arm (e.g., a rotatable arm), and a set of lights arranged along the arcuate surface of the measurement volume interior (e.g., evenly distributed; arranged along the edges or center of the measurement volume arc). The measurement volume material can be: textured (e.g., diffuse or scatter incident light, create diffuse reflections), matte, mirrored (e.g., create specular reflections), function as optical waveguides, and/or have other optical properties. The measurement volume can be white, black, and/or any other suitable color.

The computing system can function to perform the method described below. The computing system can be a local computing system, a remote computing system (e.g., network connected servers), and/or any other suitable computing system.

The computing system can optionally function to execute or include one or more processing modules. Processing modules can include: mask generation module (e.g., configured to perform S200), a mesh generation module (e.g., configured to perform S200), a physics module, a rendering module (e.g., configured to perform S700), and/or any other suitable module. The computing system can additionally include a control module, which can function to move the pedestal, imaging system(s), robotic arm, end effector, and/or any other system components. The control module can function to control the light emitting elements (e.g., fully light the object, front light the object, back light the object, and/or otherwise light the object during image capture). The control module can turn on or off the light emitting elements, capture images, and/or perform any other suitable functionality. The control module is preferably electrically connected to the pedestal, imaging systems, light emitting elements, and/or any other component. However, the control module can be otherwise configured. However, the computing system can be otherwise configured.

The mask generation module can function to generate a mask of the object (e.g., in each image, for the image set, etc.). The mask generation module can perform S200, but can additionally or alternatively perform other processes. The mask generation module can leverage one or more of: neural networks (e.g., CNNs, RNNs, etc.), machine learning algorithms, and/or other mask generation methods.

The mesh generation module can function to generate a mesh representative of the object's geometry. The mesh generation module can perform S200, but can additionally or alternatively perform other processes. The mesh generation module can leverage one or more of: neural networks (e.g., CNNs, RNNs, etc.), machine learning algorithms, structure-from-motion algorithms, stereo methods, shape-from-shading methods, photogrammetry, active methods, passive methods, and/or other methods.

The physics module can function to simulate a scene using one or more refined meshes (e.g., configured to perform S900). The physics module can be used with a bullet simulation, PhysX simulation, BeamNG simulation, and/or any other suitable simulation. However, the physics module can be otherwise configured.

The rendering module can function to render the scene simulated by the physics module. The rendering module can leverage one or more of: ray tracing, image reprojection, mesh projection, and/or other rendering methods.

The end effector can functions to manipulate an object. Manipulation can include: grasping, pushing, scooping, pulling, suctioning, dropping, and/or any other suitable manipulation. The end effector can be impactive, ingressive, astrictive, contigutive, and/or any other suitable type of end effector. In a first example, the end effector is a suction gripper. In a second example, the end effector is a claw gripper (e.g., dual prong, tri-prong, etc.). However, any other suitable type of end effector can be used. The end effector can be actuated: electrically (e.g., servo/motor actuation), pneumatically, hydraulically, unactuated (e.g., passive deformation based on motion of robotic arm, rigid body, etc.), and/or otherwise actuated. However, the system can include any other suitable end effector. The end effector is preferably mounted to the robotic arm, but can additionally or alternatively be mounted to and/or transformed by any suitable actuation mechanism(s) (e.g., CNC gantry system, etc.) and/or in any suitable actuation axes (e.g., 6-axis robotic actuation). However, the end effector can be otherwise configured.

The robotic arm can functions to position and/or articulate the end effector for grasping an object, but can additionally or alternatively provide any other suitable functionality. The robotic arm can be articulated by automatic control and/or can be configured to automatically execute control instructions (e.g., control instructions determined based on the grasp point, dynamically determined control, etc.), however the system can alternatively be otherwise suitably controlled and/or otherwise suitably enable end effector articulation. The robotic arm can include any suitable number of joints which enable articulation of the end effector in a single degree of freedom (DOF). The arm preferably includes 6 joints (e.g., a 6-axis robotic arm), but can additionally or alternatively include seven joints, more than seven joints, and/or any other suitable number of joints. However, the robotic arm can be otherwise configured.

The system can be used with one or more physical objects, one or more meshes (e.g., collection of vertices, edges, and faces that define a shape of a polyhedral object), one or more masks (e.g., 2D or 3D bitwise representation such as values are 0 or 1), and/or any other components.

The physical object can be rigid, deformable, and/or include any other characteristic. Examples of objects that can be used include: plush toys, plastic toys, cosmetics, and/or any other suitable object. The object can be unknown (e.g., no prior information is available to the system). Alternatively, all (or some) of the object parameters are known (e.g., material properties, such as transparency, reflectivity, etc.; whether the object has a transparent or reflective surface; size; geometry; name; etc.). The object can be associated with: an object identifier (e.g., assigned by a user, automatically assigned, etc.), an object mesh (e.g., generated by the method, retrieved from a database, etc.), a set of object images and/or object image segments (e.g., generated by S100), and/or other information.

However, the system 20 can additionally or alternatively include any other suitable components and/or be otherwise configured.

5. Method

The method for training data generation can include: determining a set of images S100; generating an object mesh using the set of images S200; optionally determining one or more object components of the object mesh S300; optionally adding one or more keypoints to the refined mesh S400; optionally determining a material property set for the object S500; optionally modifying the object mesh S600; determining training data S700; optionally training one or more object detectors using the training data S800; detecting objects using the trained object detector S900; and/or any other suitable elements.

The method is preferably performed by the system disclosed above, but can be otherwise performed. The method is preferably independently performed for each object, but can alternatively be performed for multiple objects at once. S100-S260 is preferably performed at least twice for each object: once for the object top and once for the object bottom; however, S100-S260 can alternatively be performed once (e.g., when the pedestal footprint is smaller than the object, when the pedestal is transparent, etc.).

5.1 Determining a Set of Images S100

Determining a set of images S100 can function to determine one or more images for object mesh generation (e.g., object model reconstruction) and/or object instance rendering for generating training data. All or portions of S100 can be repeated one or more times until a termination event is met (e.g., the sampling sequence is completed, a predetermined number of object views are captured, a threshold number of images are captured, capture period ends, etc.). S100 is preferably performed for a single object at a time, but can alternatively be concurrently performed for multiple objects.

The set of images is preferably captured using the image capture environment, but can additionally or alternatively be captured using a different image capture environment, received from a separate system, retrieved from a database (e.g., wherein the images can be captured or received and stored in the datastore), and/or otherwise obtained. When the set of images is captured using the image capture environment, determining the set of images can include calibrating the camera(s) of the environment before image capture, or not calibrating the cameras.

The set of images preferably cooperatively encompass all (or a subset thereof) visible regions of the object (e.g., include images from all viewpoints of the object), such that the images cooperatively form a photo dome, photo sphere, inverse photosphere, inverse panorama, object panorama, or dome of the object, but can additionally or alternatively encompass a subset of the object viewpoints (e.g., include a top-down view, a 360 degree segment of the object sides, etc.). The viewpoints from which the images are captured can include: 5 viewpoints, 10 viewpoints, 15 viewpoints, and/or any other suitable number of viewpoints. Image capture at a particular viewpoint can include one or more image captures (e.g., to capture a front lit image, a back lit image, and/or both a front lit image and back lit image). The set of images can include a plurality of images per side of an object (e.g., 1, 10, 50, 100, 200, 300, 400, etc.), a single image per object side, and/or any other number of images. However, the set of images can be otherwise configured.

Each image preferably depicts an object, a calibration pattern, a pedestal, and/or any other suitable components. Each image can be captured by a camera of the system or of a separate system. Each image can be associated with a camera pose (e.g., relative to the pedestal, the measurement volume, and/or any other reference frame), pedestal pose, and/or other pose, which can be used to convert data from one reference frame to another. The pose(s) can be refined using a bundle adjustment based on the calibration pattern and/or otherwise refined. Each image can be front lit, back lit, and/or otherwise lit. Each image can be: RGBD, RGB, black and white, depth images, and/or any other suitable image.

The depth images can include depths for a plurality of points in the measurement volume, optionally surface normals for points in the measurement volume, and/or any other information. The depth images are preferably dense (e.g., includes a depth or height or distance to camera per object surface depicted in each pixel), but can alternatively be sparse (e.g., includes a depth for less than a threshold proportion of the pixels depicting the object). However, the depth images can be otherwise defined.

Each image can optionally be associated with the sampling parameters (e.g., relative lighting direction, lighting intensity, etc.) of the system during image capture. Sampling parameters can include: lighting parameters, pedestal parameters, camera parameters, and/or parameters for other components. Examples of sampling parameters can include: which light sets to operate, lighting direction, light intensity, light color, camera pose, camera exposure, camera zoom, pedestal pose, pedestal angular position, object pose, sequences thereof, and/or other parameters. Sampling parameters can be determined automatically, manually, be predetermined (e.g., a predetermined pose and lighting sequence), be dynamically determined (e.g., based on the images that have already been sampled, object complexity, object parameters, etc.), or otherwise determined.

However, the image can be otherwise configured.

Figure 3:
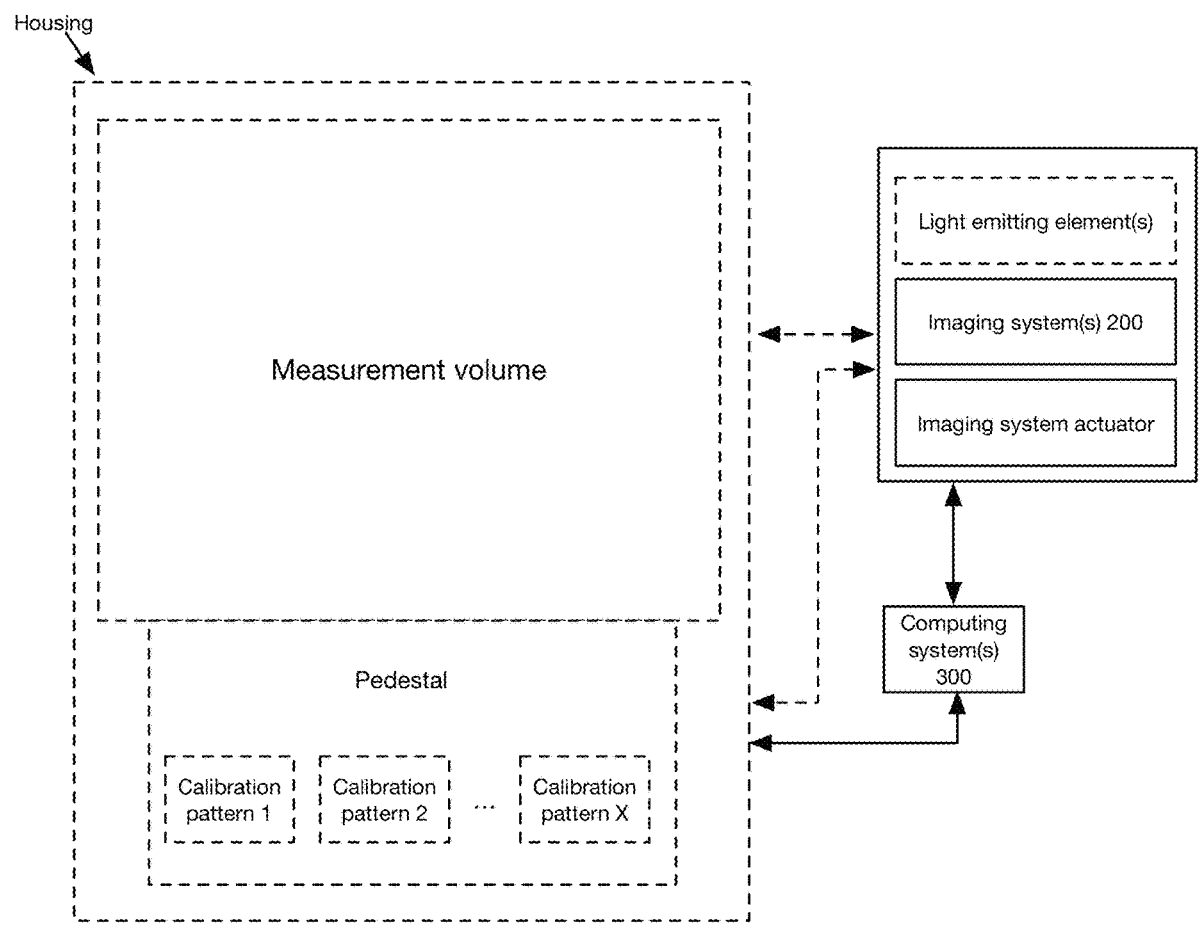
FIG. 3 is a schematic representation of a variant of the system.
Figure 4:
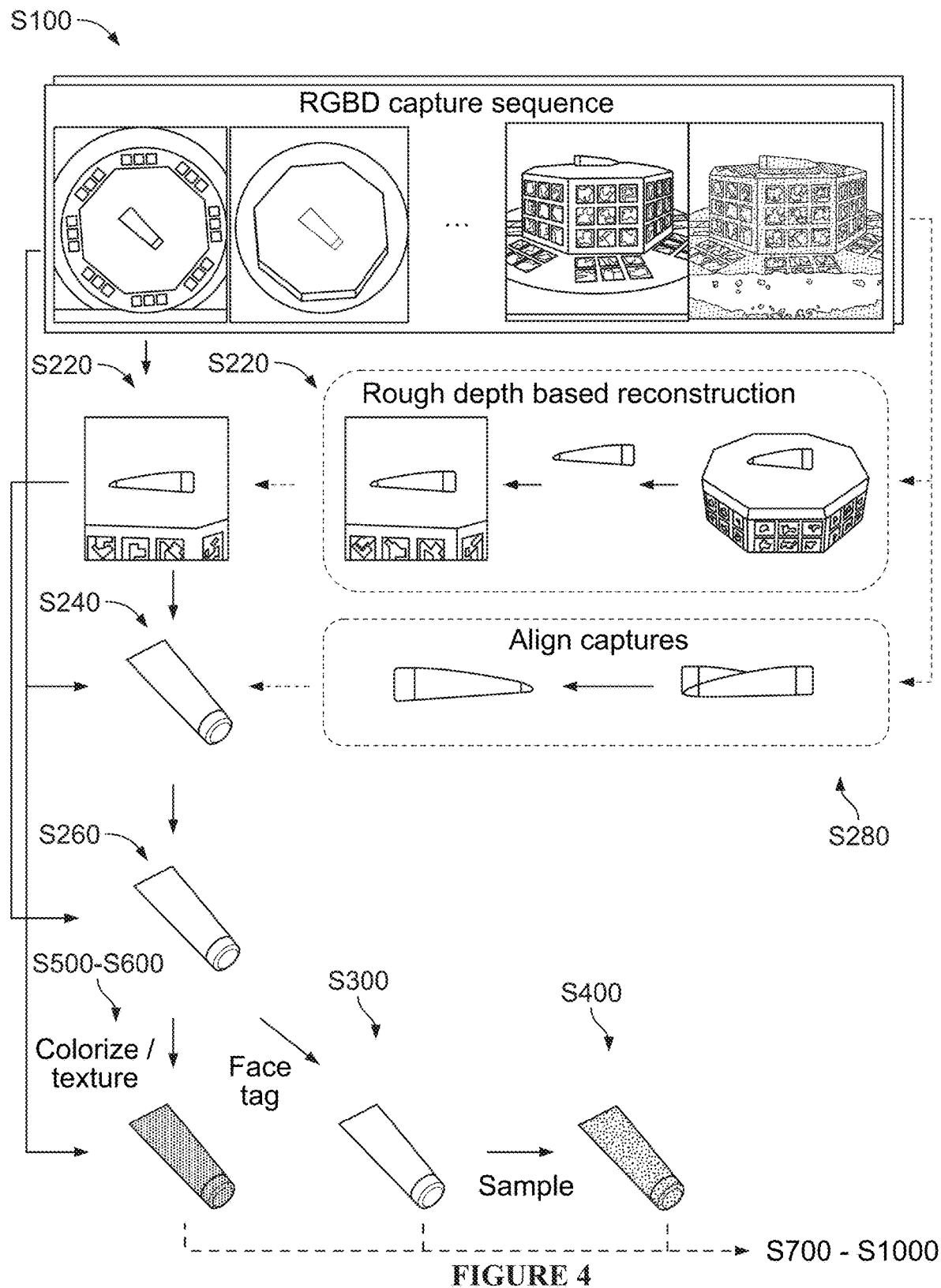
FIG. 4 depicts an illustrative example of an embodiment of the method.

S100 preferably includes: receiving an object within the measurement volume, controlling the system according to a set of sampling parameters, and sampling one or more images of the measurement volume and/or object. S100 can optionally include determining one or more depth images using the depth sensor(s) of the system (e.g., as depicted in FIGS. 3 and 4).

The object can be received: from a user, from the robotic system (e.g., wherein the robotic system randomly grasps an object and places it within the measurement volume), from a conveyor, and/or be otherwise received.

The set of sampling parameters can be determined based on: a predetermined set of sampling parameters, the object's material properties (e.g., slower rotation rate when the object is deformable; backlighting and frontlighting the object when the object is translucent or reflective; etc.), and/or otherwise determined. Examples of sampling parameters that can be controlled include: the sampling rate, the pedestal rotation rate, the imaging system actuation rate, which light sets are on or off, the lighting parameters of each light set (e.g., color, temperature, intensity, hue, etc.), and/or the object position within the measurement volume, and/or any other suitable parameter.

The images are preferably sampled by the imaging system (e.g., while the system is being operated according to the sampling parameters), but can be otherwise sampled. The images can include 2D images, 3D representations (e.g., depth map, point cloud, etc.), and/or any other suitable image. One or more images can be contemporaneously (e.g., concurrently, simultaneously, captured with a slight delay, etc.) sampled by the same or different image sensor, but be sampled at different times. When the images are sampled by different sensors, the sensors are preferably coincident (e.g., have the same or similar pose relative to the object; have less than a threshold pose difference between the sensors; etc.), but can alternatively have different poses. When multiple images are contemporaneously sampled, the images are preferably pixel-aligned, but can alternatively be misaligned. For example, an RGB image can include a scene depth value for all or a portion of the RGB image pixels. In a first variant, the pixel-aligned images are sampled by the same sensor (e.g., a CCD or CMOS sensor samples both the RGB images and the information used to extract depth from the scene). In a second variant, the pixel-aligned images are sampled by different sensors, wherein the respective measurements are aligned using a calibration for the sensor pair. However, the images can be otherwise determined.

In a first variation, S100 includes: rotating the pedestal to a predetermined position, controlling the light emitting elements according to the lighting parameters, moving the camera on an arc with respect to the center of the pedestal, sampling the images, and repeating the process until the termination event is met.

In a first example, the light emitting elements are controlled to front-light the object.

In a second example, the light emitting elements are controlled to sequentially front-light then back-light the object (and/or vice versa), wherein multiple images (e.g., including a first image wherein the object is front-lit and a second image wherein the object is back-lit) are sampled at each object position. This can help with object parameter determination.

In a third example, the light emitting elements are controlled to backlight the object, which can enable object silhouette determination.

In a second variation, S100 includes continuously rotating the pedestal while the camera samples a series of images. In this variation, the object pose relative to the camera can be determined based on the object itself, based on the calibration features, and/or otherwise determined. In this variation, the lighting parameters can be constant for each rotation, vary throughout the rotation, and/or be otherwise configured.

However, S100 can be determined using a combination of the above, or otherwise performed.

5.2 Generating an Object Mesh Using the Set of Images S200

Generating an object mesh using the set of images can function to determine a representation for the object that can be used to model the object in a virtual scene. The object mesh is preferably determined based on the set of images, but can additionally or alternatively be determined based on any other suitable information. The object mesh can include a full object mesh for the object, multiple refined meshes that represent different sides of the object (e.g., when the refined meshes cannot be aligned), and/or any other suitable mesh.

Generating the object mesh (e.g., as shown in FIG. 12) can include: optionally determining a set of masks based on the set of images S220; determining a first mesh based on the set of images and/or the set of masks S240; optionally determining a refined mesh by recomputing the first mesh S260; optionally generating a full object mesh based on the refined mesh S280; and/or any other suitable elements.

Determining a set of masks based on the set images S220 can function to isolate the image segments depicting the object from the remaining components of the system (e.g., pedestal, cavity, calibration pattern(s), etc.) in the images (e.g., as depicted in FIG. 4 and FIG. 5). The masks can be used to: generate a rough mesh (e.g., to determine whether sufficient object data has been captured, such that a refined mesh can be generated), used as a starting point for the improved masks, and/or otherwise used.

Figure 11:
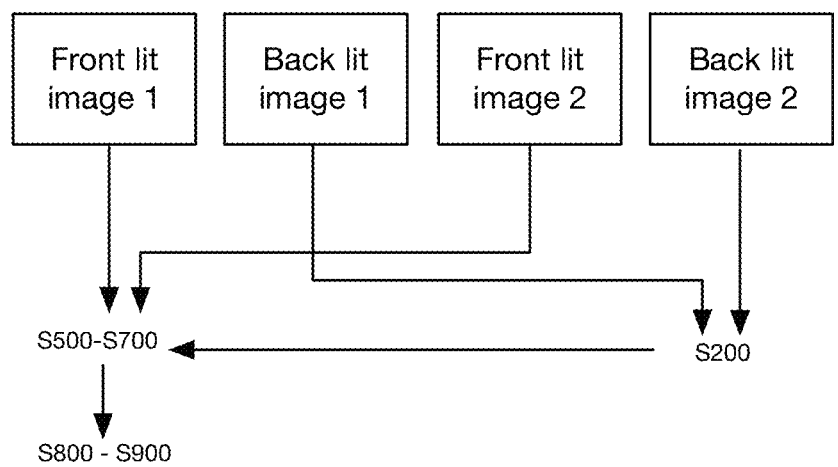
FIG. 11 depicts an embodiment of the method.

The masks are preferably indicative of the object pixels and/or area in each image, but can alternatively be indicative of other system components appearing within the image. The masks are preferably highly accurate (e.g., include less than a threshold number of non-object pixels, exclude less than a threshold number of object pixels, etc.), but can alternatively be inaccurate (e.g., include more than a threshold number of non-object pixels, exclude more than a threshold number of object pixels), be a bounding box, and/or be any other mask. One or more masks can be determined for each image. When the set of images includes front lit images and back lit images, the back lit images are preferably used to determine the object masks (e.g., as shown in FIG. 11). However, the front lit images can additionally or alternatively be used to determine the object masks.

The masks are preferably determined after S100, but can alternatively be determined after S300 (e.g., using the object mesh) or otherwise determined. The masks are preferably initialized using the depth map (e.g., associated with the images), but can additionally or alternatively be initialized from the images themselves, from other images, and/or otherwise initialized. The masks can be refined using the front-lit and/or back lit images, and/or refined using any other information.

The masks can be determined using: image segmentation (e.g., using classical approaches, AI based techniques, etc.), depth map segmentation (e.g., thresholding the depth map at the pedestal height), mesh reprojection, a combination thereof, and/or any other suitable method.

In a first variant, determining the set of masks can include: determining a point cloud from a depth map (e.g., using depth integration); generating a rough mesh using the point cloud; and optionally removing the pedestal from the rough mesh (e.g., using plane identification and/or plane fitting, matching of a known pedestal plane to a plane in the point cloud, matching a known pedestal geometry to the estimated pedestal location within the point cloud, etc.). After generating the rough mesh, S220 can include: generating an initial mask by projecting the rough mesh into the one or more images, wherein the initial mask includes binary values at each pixel location of the image that indicate if the pixel is part of the object; optionally cropping the image to the mask; and refining the initial mask, such as by using a grabcut algorithm (e.g., wherein the masked segment is treated as the bounding box), a segmentation algorithm (e.g., neural network, clustering algorithm, etc.), and/or other image-based algorithms (e.g., for color images, grayscale images, etc.). Refining the initial mask can include using one or more of the above algorithms to include or exclude a pixel of the initial mask (e.g., relabel the pixel) based on whether the pixel is identified as an object pixel. The output of refining the initial mask is preferably a masked image segment, but can be any other suitable information.

In a second variant, determining the set of masks can include determining an object silhouette from back lit (and/or front lit images), and using the silhouette as a mask for each image. Determining the object silhouette can include determining background pixels based on intensity (e.g., having an expected intensity determined from the sampling lighting parameters; having a higher intensity in the back lit images; etc.), and segmenting the object pixels from the background pixels.

However, the set of masks can be determined using a combination of the above (e.g., in series, to provide votes for each pixel, etc.), or otherwise determined.

5.3 Determining a First Mesh Based on the Set of Masks S240

Determining a first mesh based on the set of masks S240 can function to determine a virtual object (e.g., volumetric object mesh, 3D reconstruction, etc.) for use in scene modelling.

Parameters of the virtual object are preferably similar to and/or the same as parameters of the physical object (e.g., be an accurate virtual model of the physical object), but can alternatively be different. Virtual object parameters can include: dimensions, geometry (e.g., scaled, unsealed), visual parameters (e.g., object colors, color locations, surface parameters, etc.), and/or other parameters.

S240 is preferably performed after S220 (e.g., after determining the set of masks), but can additionally or alternatively be performed after S100, and/or at any other suitable time.

The first mesh can be determined based on the set of images (e.g., from S100, depth images (e.g., from S100), the rough mesh (e.g., from S220), the masked image segments (e.g., from S220), the set of masks (e.g., from S220), and/or any other suitable data.

The first mesh can be determined using: monocular cues methods, stereovision methods (e.g., passive stereo, such as estimating depth from two or more RGB images by matching features across the images; active stereo, such as shining an IR pattern on the scene to generate a pattern to be matched across two or more images; etc.), visual hull carving, depth fusion, numerical approximation, a combination thereof, and/or any other suitable mesh generation method. Alternatively, the first mesh can be retrieved from a database (e.g., provided by an object manufacturer or distributor, from object CAD, etc.), or otherwise determined.

Figure 13:
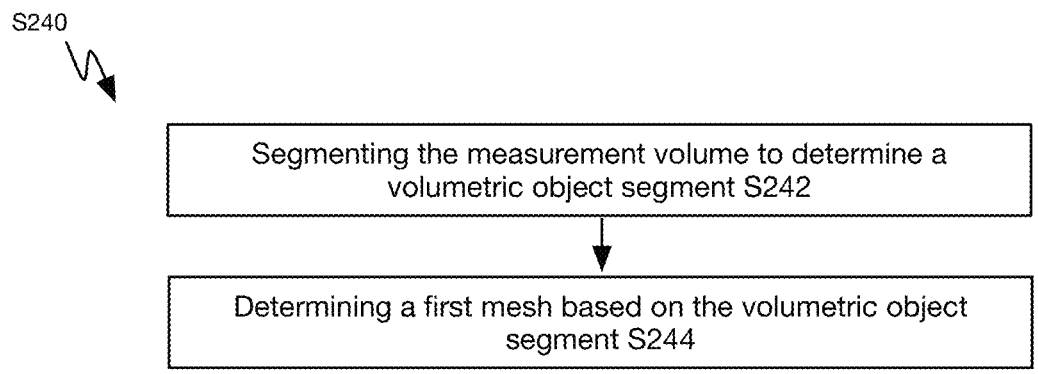
FIG. 13 depicts an embodiment of S240.

S240 preferably includes (e.g., as shown in FIG. 13): segmenting the measurement to determine a volumetric object segment S242 and determining a first mesh based on the volumetric object segment S244. However, the first mesh can be otherwise determined.

Segmenting a measurement volume S242 functions to determine a detailed volumetric representation of the object and/or segment the measurement volume into object and non-object voxels. The volumetric object segment can be a point cloud, a set of voxels, and/or otherwise represented. The volumetric object segment can be denser than the depth map, sparser than the depth map, or otherwise related to the depth map. The volumetric object segment can be determined based on the depth map, images, the masks (e.g., determined in S220), a combination thereof, and/or any other suitable data. The measurement or object volume can be represented as an octree and/or any other suitable representation. The masks can define a shape of the object from which to determine a detailed volumetric representation of the object.

In a first variant, segmenting the measurement volume can be performed using a visual hull algorithm (e.g., using volumetric carving), wherein the set of masks are used as the foreground masks for the visual hull algorithm. The visual hull algorithm can output an updated point cloud (e.g., a point cloud of the object, a set of voxels labeled with "object" or "background," etc.), and optionally output a visual hull (e.g., bounding geometry of the object), wherein the updated point cloud is used to determine the first mesh.

In a second variant, segmenting the measurement volume can be performed using a depth fusion algorithm (e.g., using a signed distance function, such as a truncated signed distance function (TSDF), fast marching method, fast sweeping method, level-set method, etc.) using a masked depth map. Depth fusion algorithms can be particularly useful to detect object concavities, or otherwise used. The depth map (e.g., sampled in S100) can be masked using the masks from S220, the visual hull from the first variant, and/or other inputs.

In a third variant, segmenting the measurement volume can be performed using a combination of volumetric object segmentation techniques, wherein each voxel or point is assigned to the object and/or to a non-object (e.g., background) based on the votes from different variants.

In a specific example, S240 includes segmenting the measurement volume using multiple methods (e.g., visual hull carving and TSDF), wherein each method provides a vote on a per-voxel basis on whether the voxel is an object voxel or non-object voxel. Each vote can be weighted (e.g., based on the votes generation technique) or unweighted. Voxels with more than a threshold number of votes (and/or more than a threshold score, calculated from the votes) can be considered object voxels, while votes with less than a threshold number of votes or score can be considered background voxels.

However, the measurement volume can be otherwise segmented.

Determining a first mesh based on the volumetric object segment S244 functions to generate a virtual geometric representation of the physical object. The first mesh is preferably generated from the object voxels of the volumetric representation of the object, but can additionally or alternatively be determined from the depth map, images, or other data. The first mesh is preferably generated by fitting a mesh to the outermost object voxels, but can be otherwise generated. The first mesh is preferably finer (e.g., includes more nodes, shorter edges, etc.) than the rough mesh used in S220, but can alternatively have the same coarseness or be coarser. The first mesh is preferably not generated from the rough mesh, but can alternatively be generated using the rough mesh (e.g., as a starting mesh that is refined, as a validation reference, etc.).

Determining the first mesh can include meshing the first mesh (e.g., connecting points of the point cloud into oriented triangles). Meshing the first mesh can be performed using Poisson meshing, Delaunay triangulation, Voronoi-based surface reconstruction, a minimum spanning tree technique, and/or any other suitable surface reconstruction algorithm.

However, the first mesh can be otherwise determined.

Determining a refined mesh by recomputing the first mesh S260 can function to determine a more accurate mesh for the object (e.g., further refine the collection of vertices, edges, surfaces, and/or surface normals that define the object). In variants, determining the refined mesh can function to adjust the shape and/or appearance of the first mesh to closely match the object.

The refined mesh is preferably determined using the first mesh received from S240, but can additionally or alternatively be performed based on any other suitable information. The refined mesh can encompass half the object (e.g., one hemisphere of the object), the entirety of the object, and/or any other suitable portion of the object.

Determining the refined mesh can include: determining refined masks by re-projecting the first mesh into the set of images; updating vertex locations such that the rendered mesh is consistent with captured image data; refining the surface normals, such as using an algorithm (e.g., BRDF, averaging, outlier exclusion, etc.); and/or any other suitable element. Determining the refined mesh can be performed by: minimizing offset between refined masks and the masks computed in S200; by maximizing photoconsistency of the rendered mesh to the RGB images captured in S100 (e.g., using gradient descent, triangulation, etc.); and/or by any other suitable optimization. The optimization can optionally be alternated with smoothing (e.g. bilateral filtering, poisson remeshing, etc.), such that the mesh is locally smooth but high level features such as edges and corners are preserved. Alternatively, the smoothing operation can be performed after the optimization, before, and/or at any other suitable time.

Determining the refined mesh can include: finding point correspondences between the set of masks (e.g., from S220) and the refined masks or mesh (e.g., from S240) and triangulating vertex errors using the point correspondences such that the refined masks are closer to the masks computed in S220. The point correspondences can be determined: using a closest point algorithm; by detecting features and determining correspondences based on the detected features, and/or using any other suitable technique.

In a first variant, the point correspondences can be determined by: projecting the refined mesh into one or more camera views where the refined mesh corresponds to the object's silhouette in that camera view; and moving and/or adjusting (e.g., deforming) the refined mesh (e.g., in 3D) so that the refined mesh matches the silhouette in all camera views using a fine-grained mismatch technique that ingests the observed silhouette as input.

In a second variant, the point correspondences can be determined by matching a visual patch and/or feature of the refined mesh across multiple camera views; and adjusting (e.g., deforming) the corresponding mesh element of the refined mesh (e.g., in 3D) to consistently generate a texture of the visual patch and/or feature in all (or a subset thereof) the camera views.

Additionally or alternatively, the refined mesh can be determined using adaptive mesh refinement, Delaunay refinement (e.g., Chew's second algorithm, Ruppert's algorithm, etc.), and/or any other suitable algorithm.

However, the refined mesh can be otherwise determined.

Generating a full object mesh by combining multiple refined meshes S280 can function to determine a 360-degree object mesh (e.g., combine meshes to form a complete 3D representation of the object). The full object mesh is preferably generated using two or more refined meshes (e.g., depicting different sides of the same object), but can alternatively be generated from a single mesh, from the first mesh, from the rough mesh, and/or otherwise determined. The full object mesh can be: uncolorized, untextured, only include the object geometry, colorized, textured, and/or have any other suitable visual properties.

Generating the full object mesh can be performed before and/or after S260, after S220, before and/or after S240, before and/or after S400, after multiple refined meshes have been determined for different sides of the same object, after keypoints are added to each of the multiple refined meshes, and/or performed at any other suitable time.

S280 can be performed based on one or more: image sets (e.g., obtained from one or more instances of S100 for different views of the same object), the refined mesh(es) (e.g., from S260), and/or any other suitable information. S280 can be performed by merging one or more image sets, by retrieving material properties from a predetermined database (e.g., based on an object identifier), and/or otherwise determined.

In a first variant of the input to S280, a portion of the method (e.g., S100 and S220-S260) can be performed to determine a first refined mesh for a first side of an object, the object can be flipped (e.g., automatically using a robotic arm, manually, etc.), and be repeated to determine a second refined mesh for a second side of the object. The first and second refined meshes can be combined in S280.

In a second variant of the input to S280, two sets of images can be determined in S100, wherein the first set includes images of a first side of the object and the second set includes images of a second side of the object. The sets of images can be processed by S220-S260 in parallel and/or in series to determine a first and second refined mesh, which can be combined in S280.

In a first variant of S280, combining multiple refined meshes can be performed by aligning refined meshes using features extracted from the associated point clouds (e.g., depth maps), images, the refined meshes, and/or other features. In one example, the alignment features can include an extracted SIFT feature point cloud from each refined mesh, which can include matching keypoints across point clouds.

In a first embodiment, if a predetermined number of keypoints are matched, then the refined meshes are combined; otherwise the meshes are not combined.

In a second embodiment, each SIFT keypoint (e.g., 3D, 2D, etc.) is associated with one or more votes (e.g., number of images that include the keypoint). When aligning multiple point clouds, there are some number of scene-layers associated with the keypoints that agree with the transformation (e.g., determined from aligning keypoints). Each scene-layer has a number of images that voted on it. There is a predetermined threshold on the number of votes per scene-layer and when the number of votes is above the threshold, the refined meshes are combined.

In a second variant of S280, combining multiple refined meshes can include: initializing a transformation by flipping a refined mesh upside-down and rotating the refined mesh along the z-axis in discrete steps; aligning the refined meshes after each rotation (e.g., for N rotations) using a geometric alignment algorithm (e.g., ICP); and selecting the alignment with the minimum alignment error and/or based on a predetermined alignment error threshold. If the alignment error is above the threshold, the refined meshes are not combined. The full object mesh can additionally or alternatively be otherwise determined.

However, the object mesh can be otherwise determined.

5.3 Determining One or More Object Components of the Object Mesh S300

Determining the object components (e.g., faces, parts, etc.) of the object mesh can function to determine and/or label connected components for grasping, determine and/or label components for keypoint placement in S400, and/or any other suitable functionality. One or more object components can be determined for an object (e.g., 2, 4, 8, 11, etc.); however, the object can have a predetermined number of components (e.g., 6 faces, from a bounding box), or have any other suitable number of components. An object component is preferably an object face, but can additionally or alternatively be an object part (e.g., handle, limb, head, body, lid, etc.), and/or any other component of an object. A face is preferably on the mesh, but can additionally or alternatively be a face of a bounding box for the object (e.g., wherein points on the bounding box can be mapped to corresponding points on the object mesh) or any other suitable face. Each object component can be assigned a unique identifier (e.g., locally unique identifier for the object, globally unique identifier), or be unidentified. Each triangle of the mesh can be assigned to component of the object that the mesh cell (e.g., triangle) is located on or cooperatively defines (and/or be associated with the component's identifier), or be otherwise associated with a location on the object. Each vertex (e.g., of the triangle, of the mesh) can be assigned to the component that the vertex is located on, cooperatively defines, that the respective mesh cell is associated with (and/or be associated with the component's identifier), and/or otherwise assigned. Each component can be assigned one or more geometric object properties which can be used to determine an object grasp.

Each object component can include one or more keypoints arranged along the component center, randomly distributed across the surface or volume of the object component, arranged along the component boundaries, arranged in graspable regions, such as flat regions, equally distributed along the object component surface or volume, be roughly geodesically equidistant on an object mesh (e.g., component tag mesh, object face submesh, etc.), and/or otherwise arranged.

In a first variant, the object components can be determined by subdividing the object mesh (e.g., from S200) into connected components. The object mesh can be subdivided into object components based on local features of the object mesh. The local features of the mesh geometry of the object mesh can include: geometric object properties (e.g., surface curvature, surface area, surface normals, etc.), planes, and/or any other suitable features. The object components can be determined using the local features (e.g., using geometric object properties, plane fitting, etc.); manually; by identifying contiguous surfaces, using rules or heuristics (e.g., using contiguous surfaces between discontinuities, based on surface normals, based on surface areas, etc.), and/or otherwise determined. In one example, different object components can be determined based on mesh normal continuity (e.g., wherein different faces are identified when the mesh or surface normal changes more than a threshold amount between adjacent mesh cells), a graspability function, and/or otherwise determined.

In an embodiment of the first variant, determining one or more object components can include computing vertex curvature; classifying vertices as curved if the curvature is above a threshold; computing a new mesh (e.g., component tag mesh), wherein the edges belonging to curved vertices are removed; extracting connected components (submeshes or subgraphs); and labelling each vertex according to a connected component identifier associated with the connected components. Computing vertex curvature can include: collecting neighbor vertices within a predetermined radius distance (e.g., measured as the sum of edge lengths); representing the plane that the vertices lie on (e.g., using the mean vertex position and mean normal); measuring the distance of each vertex to the plane; and setting curvature to be the N-th percentile of distances to the plane. However, the vertex curvature can be otherwise computed.

In a second variant, the object components can be determined by generating a component tag mesh. The component tag mesh can function to segment the mesh surface into component parts for labelling keypoints. The component tag mesh can be generated by building the component tag mesh from the triangles of the object mesh. Generating a component tag mesh can function to determine connected components of the object. The component tag mesh can be used for grasping the object (e.g., determining a set of object grasp locations) and/or used for any other suitable task. Vertices, mesh cells, and/or keypoints (of the face tag mesh) lying each object face can be labelled with the respective object face's face tag, which can be used to retrieve the respective object face's properties (e.g., material properties, geometric properties, etc.).

In a third variant, the object components can be determined based on a bounding box surrounding the object. The bounding box can be determined based on the object mesh, such as fitting a rectangular box around the object mesh such that the entire object mesh fits within the box and/or using any other suitable technique. Determining the object components using the bounding box can include: sampling points on a bounding box grid around the refined mesh; assigning a object component identifier to those points based on which face of the bounding box they lie; mapping each point to the nearest vertex on the object mesh; labelling the vertex on the object mesh with an object component identifier for the bounding box face from which the point was sampled (or otherwise labelling the object mesh vertex); and/or any other suitable elements. The faces of the bounding box can be mapped to the same object component based on the object's shape (and labelled as the same object component) (e.g., for tubes, all faces but the one on the tube cap can be labelled as a single face; for cylinders, all faces but the two flat sides of the surfaces can be labelled as a single face; etc.) and/or otherwise labelled. Additionally or alternatively, surface normals can be used to determine faces of the object (e.g., flat regions of tubes, cylinders, etc.). In a first example, a vertex (or triangle) can be assigned a object component identifier if its vertices are close to a corresponding bounding box face and the normals are pointed in mostly the direction of the bounding box face.

However, the one or more object components can be otherwise determined.

5.4 Adding One or More Keypoints to the Refined Mesh S400

Adding one or more keypoints to the refined mesh S400 can function to label the refined mesh with keypoints (e.g., per object component, per object, etc.), wherein the keypoints can be indicative of possible grasp points on the object and/or features of the object. The keypoints can lie on the object mesh, lie on a bounding box surrounding the object mesh (e.g., be a minimum bounding box surrounding the object mesh), and/or be otherwise related to the object mesh.

Figure 8A:
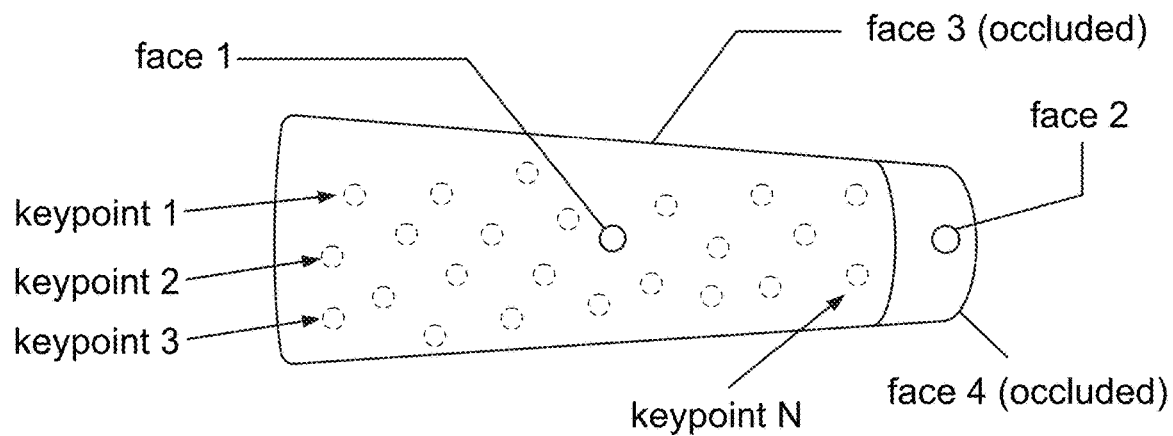
FIGS. 8A and 8B depict examples of object keypoints.
Figure 8B:
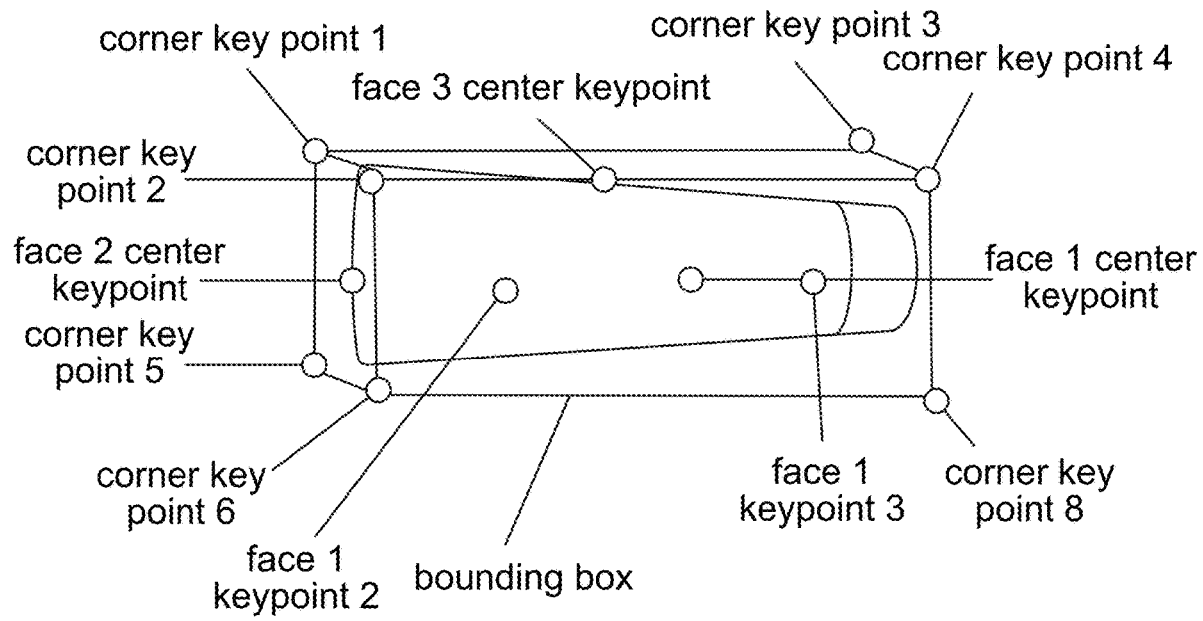

The keypoints can be points of interest, points that can be matched across multiple images, keypoints indicative of the object bounding box (e.g., corner keypoints, face centroid keypoints, edge keypoints, etc.; example shown in FIG. 8B), object component keypoints (e.g., lying on a face of the object mesh, such as shown in FIG. 8A; lying on a vertex of a face or part of the object; etc.), and/or any other suitable point. The keypoints can be 3D keypoints (e.g., identify a position and/or pose relative to the object), geometric keypoints, 2D keypoints, 2.5D keypoints (e.g., keypoint positioned relative to a given object component), and/or other keypoints. The keypoints can be independent of visual features (e.g., not determined based on visual cues, not entirely determined based on visual cues, etc.), be dependent on visual features (e.g., be traditional computer vision keypoints, such as locally unique features, edges, corners, etc.), and/or be otherwise defined. In variants, the keypoints can be 3D keypoints (e.g., tied to the object geometry), but be identified in a 2D or 2.5D reference frame (e.g., the image). The keypoints detected within the images (e.g., training images or inference images) can be for visible and/or hidden portions of the object in the image.

Each keypoint can be associated with a keypoint identifier, an orientation (e.g., a surface normal of the object face, a surface normal of a bounding box face, etc.), a 3D position (e.g., in an object frame of reference), a position or pose relative to the object mesh (e.g., fixed position on the object mesh, fixed position relative to the object mesh, variable position relative to the object mesh, etc.), and/or any other suitable information. The keypoint identifier can be: a bounding box face identifier, a corner identifier, an object component identifier (face tag, such as determined from the face labels and/or face tag mesh from S300) used to identify an object component, and/or any other suitable identifier. The keypoint identifier can be an integer, label, or any other suitable value.

The keypoints can be added to the refined mesh per object component, per bounding box face, and/or otherwise added to the refined mesh. The number of keypoints added per object component can be determined based on the size of the component, can be a predetermined number (e.g., less than 5, more than 5, more than 10, more than 20, more than 50, more than 100, a number that maximizes coverage of the object component, etc.), and/or the number of keypoints can be otherwise determined.

The keypoints can be evenly distributed across the object component, randomly distributed across the object component, added based on object surface normals (e.g., that are used to define the different object components, added to surfaces sharing similar surface normals, etc.), and/or otherwise placed on the refined mesh.

The keypoints can additionally or alternatively be ranked or prioritized for graspability (e.g., assigned a graspability score). The ranking can be determined based on the respective surface normals, the respective object face's area, the respective object face's texture, and/or otherwise determined.

In a first variant, the keypoints are bounding box keypoints, wherein the keypoints are determined by sampling keypoints on the bounding box (e.g., faces, vertices, edges, etc.); and mapping sampled points from a bounding box to a closest vertex on the object mesh. The keypoints added to the object mesh in this way can be associated with the object component identifier corresponding to the side of the bounding box that the keypoint was sampled from. Alternatively, the bounding box keypoints can inherit the object component identifier of the closest object component.

In a second variant, the keypoints are local feature keypoints, wherein the keypoints are assigned to object components that were determined from the local features determined in S300.

However, the adding one or more keypoints can be otherwise performed.

5.5 Determining a Material Property Set for the Object S500

Determining a material property set for the object S500 can function to enable more accurate object rendering in S700. The material property set can be determined contemporaneously with S200-S400, performed after S200-S400, and/or performed at any other suitable time. Material properties can include: shininess, reflectivity, transparency, color, texture, and/or any other suitable property. Each material property can be associated with a score (e.g., value between 0-10, 0-100, −1 to 1, etc.), material type label, and/or otherwise characterized. The score can be determined using BRDF, and/or using any other suitable technique. The score can be determined based on a light measurement (intensity) from S100, based on brightness (e.g., how dark each pixel is), color, and/or any other information.

S500 can be performed based on: one or more image sets (e.g., obtained from one or more instances of S100 for different views of the same object), the object mesh (e.g., from S200), and/or any other suitable information.

In a first variation, S500 includes determining object transparency. Object transparency can be determined based on: optical background distortions due to refraction, changes in chromaticity and brightness due to absorption, and/or using any other suitable method. In a first example, object transparency for all or portions of the object can be determined by evaluating the proportion or intensity of light transmitted through the object in a back lit image (e.g., as compared to the background's light intensity and/or the amount of light emitted during image capture), where the object pixels in the image can be determined based on the mask determined in S300 and/or refined mesh determined in S400 (e.g., wherein the refined mesh is reprojected back into the back lit image). However, object transparency can be otherwise determined.

In a second variation, S500 includes determining object specularity and/or reflectiveness. This variation can be used when the object is determined to be opaque (e.g., less than a threshold proportion of light is transmitted through the object in the back lit image, as determined using the first variant), always used, or applied at any other suitable time. The object specularity can be determined from the RGB images (e.g., from the same camera pose relative to the object with different lighting patterns), and/or other data. The object specularity can be determined using a bidirectional reflectance distribution function (BRDF), such as the Lambertian model, Torrance-Sparrow model, Blinn-Phong model, and/or any other suitable BRDF model, but can additionally or alternatively be determined using BSDF (bidirectional scattering distribution function), Schlick's approximation, and/or any other suitable method.

However, the material property set can be determined using a combination of the above, or otherwise determined.

5.6 Modifying the Object Mesh S600

Modifying the object mesh Shoo can function to modify the appearance of the object mesh by texturizing and/or coloring the object mesh (from S200). The modified object mesh can be determined based on the set of images (e.g., the front lit images, front lit and back lit images, etc.), the material property set, and/or any other visual information. The material property set can be used to modify the color and/or texture of the object mesh determined from the set of images (e.g., weighting color and/or texture based on a property score, coloring and/or texturing using the property score, etc.) and/or otherwise used to modify the object mesh.

In a first variation, determining a texturized object mesh can include adding color to the mesh. Adding color to the mesh can include projecting each vertex into the image and determining the color value from the corresponding pixel. Alternatively, when multiple images are used, the color value can be determined by averaging the color values across multiple images of the set of images, selecting the minimum, maximum, or otherwise selecting the color value for the vertex.

In a second variation, determining a texturized object mesh can include adding texture to the mesh. In a first embodiment, adding texture to the mesh can include projecting each triangle (and the vertices) into each image from S100 to determine based on a set of criteria (e.g., angle between triangle normal and direction to the camera, mean illumination, etc.) which image and associated pixel(s) to texture the triangle. The result of projecting each triangle into the mesh is a single texture image from croppings of images from S100, wherein each triangle is associated with a pixel coordinate identifier in the texture image for each of the triangle's vertices.

However, the object mesh can be otherwise modified.

5.7 Determining Training Data S700

Determining training data S700 can function to generate training data for training the one or more object detectors in S800. The training data is preferably one or more synthetic or augmented images, but can additionally or alternatively be one or more masks (e.g., binary masks), heatmaps, and/or any other suitable information. Each training data element (e.g., image, mask, heatmap, etc.) of the training data can be associated with a training label (e.g., per training data element, per object depicted in the training data element, etc.) (e.g., an example is depicted in FIGS. 10A and 10B). The label can include: one or more keypoints, object component identifiers (e.g., for each keypoint, for each pixel, etc.), object component orientations (e.g., object face orientation, object part orientation, etc.; for each keypoint, for each pixel, etc.), visibility scores, occlusion scores, and/or any other suitable information. In one example, the training label (e.g., training target) can include: an object keypoint associated with the portion of the object (mesh) depicted in the image, an object component label for the object keypoint (and/or locally unique object keypoint identifier), and optionally a surface normal for the keypoint. However, the training label can be otherwise constructed. The label can be a binary mask, vectors, values, and/or any other label. The label is preferably unoccluded (e.g., keypoints that are in the field of view of a virtual camera and not occluded by other object instances in the scene), but can additionally or alternatively be occluded (e.g., keypoints not in the field of view of a virtual camera and occluded by other object instances in the scene, or on a surface of the object instance that is not in the view of the virtual camera).

The training data can be determined based on: one or more scenes (e.g., rendering one or more scenes using a virtual camera's field of view); background images from various open source datasets (e.g., COCO, Boxbot, VOC, etc.) (e.g., rendering one or more object instances over the background image), and/or based on any other suitable information.

In some embodiments, generating the training data can include determining one or more scenes. Generating the training data can function to determine a scene (e.g., 2D, 3D, etc.) from which to capture training data (e.g., training images, such as using a virtual camera). The one or more scenes can be determined based on the object mesh (e.g., full object mesh, multiple refined meshes of the same object, etc.), scene environment geometries, and/or any other information. The one or more scenes can be determined using meshes from the same object or using meshes from multiple different objects. The one or more scenes can be simulated using the physics module, and/or any other simulation engine. The generated scene can include: the scene geometry, the scene's visual parameters (e.g., color, texture, etc.), and/or be otherwise constructed. S700 is preferably repeated multiple times to generate multiple scenes (e.g., a predetermined number of scenes; iteratively determined until an object detector metric, such as accuracy, reaches a predetermined threshold; etc.), but can alternatively be performed once.

Figure 9:
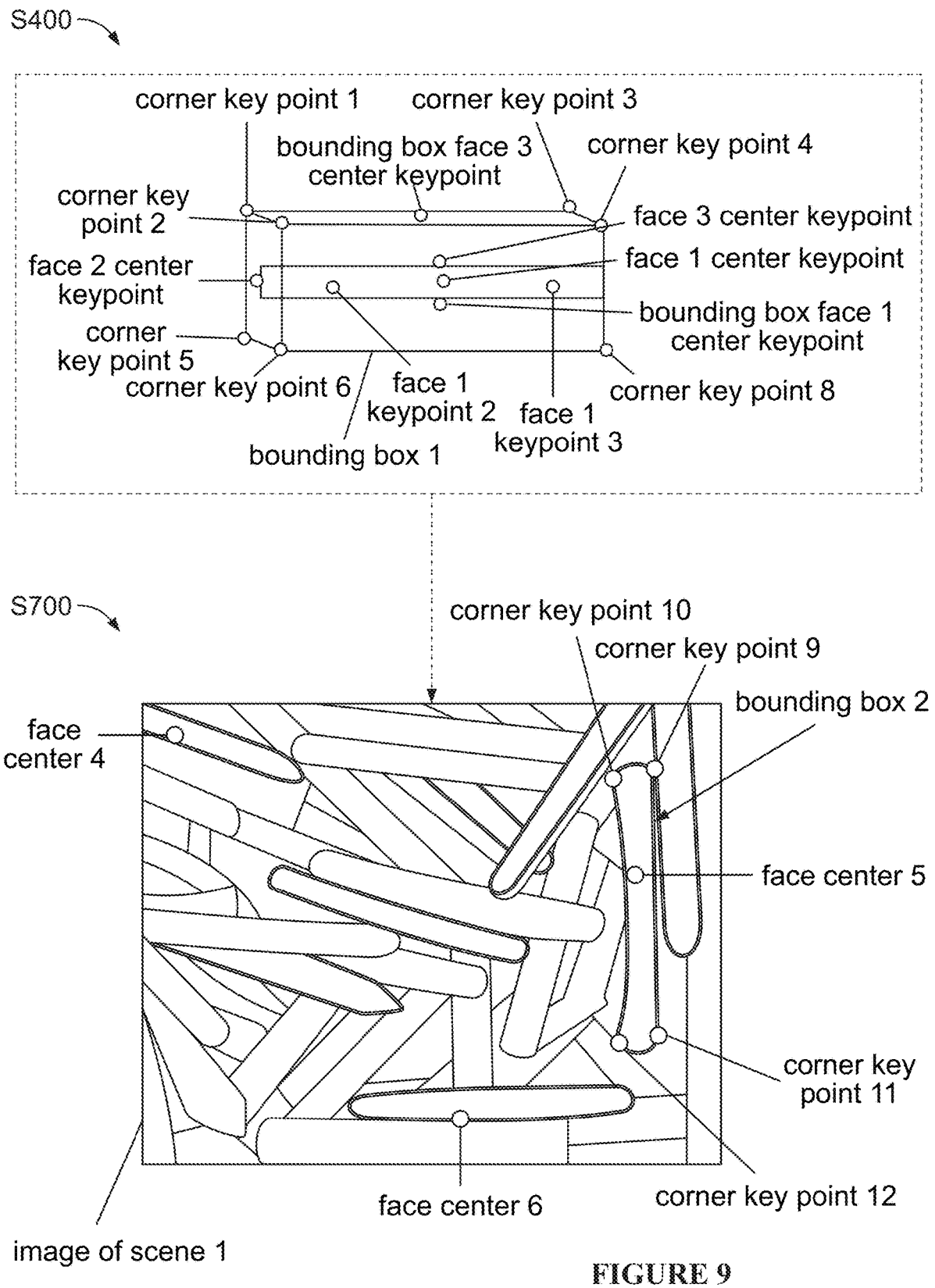
FIG. 9 depicts an example of S400 and S700.

Determining the one or more scenes can include selecting (e.g., randomly, quasi-randomly, pseudo-randomly, etc.): object types, object numerosity, poses (e.g., within the virtual grasping volume), lighting (e.g., color, position, etc.), fill level, object velocity, and/or any other parameter. The scene can include: objects arranged in a pile, objects piled within a bin, objects distributed on a conveyor belt, objects arranged on a shelving unit, and/or any other suitable configuration of objects (e.g., as shown in FIG. 9). S700 can optionally simulate object kinematics (e.g., based on gravity, object mass, etc.). For example, determining one or more scenes can include simulating the objects falling into a bin, wherein the object pose within the bin can be determined based on the falling kinematics.

In variants, when a scene is simulated using refined meshes that are not combined (e.g., not combined in S200), the gravity vectors of each mesh can be tracked during simulation. When a gravity vector of a mesh faces a camera, the mesh can be flipped (e.g., such that a known object view will be rendered in S700).

In an embodiment of the above variants, simulating the scene can be performed using two different refined meshes (e.g., when the meshes cannot be combined into a full object mesh, such as when the object is deformable). Simulating the scene can include simulating a first side of a first object instance using a first refined mesh, and simulating a first side of a second object instance using a second refined mesh, wherein the first refined mesh and the second refined mesh represent two different sides of the same object. However, the scene can be otherwise simulated using multiple refined meshes.

Determining one or more scenes can additionally include tracking the object keypoints (from S400) for each object within the simulated scene (e.g., as depicted in FIG. 9). This can include: tracking which keypoints are visible (e.g., within a virtual camera's field of view), tracking the surface normals associated with the keypoints, and/or tracking any other suitable keypoint parameter.

Determining one or more scenes can optionally include calculating an occlusion or visibility score for each keypoint, object face (e.g., for each object), object mask, and/or for a subset thereof. The occlusion score can be used to train the object detector to determine an occlusion score for each detected keypoint, or be otherwise used. The occlusion or visibility score can be calculated by identifying the visible object mesh cells that are closest to the virtual camera (across the entire object population), and, for each face of each object, calculating the proportion of object face cells (e.g., mesh cells for the given object component or face) that were identified as visible object mesh cells. Alternatively, the calculating the occlusion score can include: determining mesh cells or keypoints closest to the camera (e.g., with the shallowest depth or shortest distance to the synthetic camera) for each object; determining whether there is an intervening object, mesh cell, or keypoint between the object's closest mesh cells and the camera; and scoring the keypoints without an intervening element with a first score (e.g., "unoccluded", "1"), and scoring the keypoints with an intervening element with a second score (e.g., "occluded", "0"). Alternatively, calculating the occlusion score can include: projecting each object's components into the synthetic camera's frame; scoring the elements corresponding to portions of the object appearing in the synthetic image with a first score; and scoring the remaining elements with a second score. However, the occlusion score can be otherwise determined and used.

However, the one or more scenes for determining training data can be otherwise determined or characterized.

Determining the training data can include rendering one or more synthetic images of the one or more scenes based on one or more virtual camera views (e.g., determined randomly, predetermined, etc.). The one or more virtual camera views can be: centered above the scene (e.g., with a top-down view), above and to the right or left of the scene, and/or any other suitable view. Rendering the synthetic image of the scene can include rendering projective shadows and/or shading (e.g., determined based on the virtual camera view). Rendering the synthetic image can be performed rendering different instances of the refined mesh and/or full object mesh in the scene and using the refined surface normals.

Rendering the synthetic image of the scene can be performed using the material property set (e.g., to texture the synthetic images), using one or more images from the set of images (e.g., preferably the front lit images, such as shown in FIG. 11, but can additionally or alternatively include the back lit images), and/or using any other information. Rendering the scene can be performed using OpenGL and/or any other suitable API. Rendering can be performed based on the one or more selected parameters from S700 and/or any other parameter values.

In a first variant (e.g., on-the-fly rendering variant), rendering a synthetic image of the scene can include performing, for each object in the scene (or a subset thereof, such as the topmost objects or objects closest to the camera): determining the object pose of each object (and/or the topmost objects) relative to the virtual camera; selecting an image (e.g., preferably a front lit image, but can additionally or alternatively be a back lit image, ambiently-lit image, or other image) that is closest to the object pose (e.g., depicts the object in the specified object pose relative to the camera) and optionally, further selecting the image based on image brightness (e.g., selecting an image with median brightness), lighting angle, and/or other visual parameters; projecting the image onto the mesh, projecting an image patch per triangle onto the mesh, projecting the mesh into the image, and/or otherwise determining the visual elements associated with the visible or unobstructed object mesh cells; and rendering the masked or extracted image segment from selected image as the rendered object image.

In a second variant (e.g., auto rendering variant), rendering a synthetic image of the scene can include performing, for each object in the scene (or a subset thereof, such as the topmost objects or objects closest to the camera): determining an object pose of the object mesh relative to a virtual camera; determining an object texture for each visible triangle of the object mesh using all images of the set that depict the visible triangle (e.g., averaging the texture across all the images); and projecting the object texture onto the mesh.

In a third variant, rendering a synthetic image of the scene can be performed using image-based rendering, which can include approximating an object pose transformation from a first image to a new pose using a homography. Rendering a synthetic image of the scene in this way can respect the 3D shape of the object or alternatively approximate the object as a 2D plane. Rendering a synthetic image of the scene can be performed using the material property set, front lit and/or back lit images, and/or any other suitable information.

In a fourth variant, rendering the synthetic image of the scene can be performed by: determining colorized and/or textured versions of the object mesh; generating the scene as discussed in S700; and rendering an image of the scene based on the portions of each object mesh in the scene that are visible to a synthetic camera (e.g., by projecting the colored mesh cells into the camera frame). The colorized and/or textured versions of the object mesh can be determined by projecting the object mesh into the images sampled in S100, by retrieving the object mesh from a predetermined database, and/or otherwise determining the colorized and/or textured object mesh.

After training data is determined from rendering the one or more scenes, the training data can be post-processed. Post-processing the training data can include adjusting brightness, hue, saturation, and/or any other parameter.

The training data can additionally include: one or more synthetic images of the one or more scenes (e.g., depicted in FIG. 9); one or more real-world images of a real-world scene; masks for each object in the scene (e.g., determined by the method or real-world) and/or image (e.g., modal mask, amodal mask, etc.); one or more keypoint locations in the synthetic images (e.g., determined from projecting the keypoint from the respective object mesh into the virtual camera frame), associated identifiers (e.g., component tags, face tags, corner identifiers, bounding box face centroid identifiers, etc.), associated occlusion scores, associated graspability scores or rankings, and/or other keypoint data; the 3D bounding box for the object; object face orientations; surface normals; face visibility scores; and/or any other suitable information. The keypoints are preferably represented in the 2D image frame of reference (e.g., determined by projecting the 3D keypoint location in the 3D scene into the camera's frame), but can be otherwise represented.

In a first variant, the keypoint locations in the synthetic images can be determined using the scene simulation, which tracks the keypoints for each object in the scene. Keypoint information that can be tracked include: which object instance that the keypoint belongs to, the keypoint location relative to the object instance, the keypoint pose within the scene, the keypoint tags or labels, and/or other information. After the scene is simulated, the unoccluded keypoints (e.g., closest keypoint to the virtual camera within the virtual volume corresponding to a virtual camera's pixel) can be used as a training label for the synthetic image. The keypoint locations can additionally or alternatively be determined (e.g., added to a training data label) based on the orientation of a particular object mesh in the synthetic scene (e.g., using a pose of the object mesh to look up the unoccluded keypoints for the object pose, and using the unoccluded keypoints as the training label). In a first embodiment of this variant, the unoccluded object keypoints in the synthetic scene can be represented as a binary mask, wherein the binary mask is used to train the object detector to identify unoccluded object keypoints in synthetic image.

In a second variant, the keypoint locations in the synthetic images can be determined by tracking object components in the scene simulation, and sampling keypoints from the object components in the synthetic image as the unoccluded keypoints for the training label. Additionally or alternatively, the object components can be used as the training label (e.g., unoccluded portions of the object components).

However, the training data can be otherwise determined.

5.8 Training One or More Object Detectors Using the Training Data S800

Training one or more object detectors using the training data S800 can function to train one or more object detectors for object detection (e.g., detecting keypoints based on images). The one or more object detectors can be trained for the same object, different objects (e.g., each detector is trained to detect keypoints for a particular object), and/or the one or more detectors can be otherwise trained. Training the one or more object detectors can be performed by the system, by a separate system, and/or any other suitable system. The one or more detectors can receive the synthetic image and/or training data image as input. The one or more detectors can be trained to determine the training label associated with the synthetic image and/or training data image. The one or more object detectors can be a: neural network (e.g., feed forward neural network recurrent neural network, convolutional neural network, etc.); Viola-Jones object detection model; Scale-invariant feature transform model (SIFT), Histogram of oriented gradients model (HOG), graphical model (e.g., RCN, Bayesian network, etc.), and/or any other suitable detector. The convolutional neural network can be a: you only look once (YOLO), region proposal network (e.g., R-CNN, cascade R-CNN, Fast R-CNN, Faster R-CNN), a single shot multibox detector (SSD), a retina-net, deformable convolutional networks, and/or any other suitable neural network. Training the one or more object detectors can include using an optimization algorithm to find a set of weights for the object detector that best maps the input image to detected keypoints. The optimization algorithm can be: gradient descent, stochastic gradient descent, mini-batch gradient descent, Adam algorithm, Nesterov accelerated gradient algorithm, Adagrad algorithm, AdaDelta algorithm, and/or any other suitable algorithm.

A first specific example of the network is described in U.S. application Ser. No. 13/895,225 filed May 16, 2013, which is incorporated herein in its entirety by this reference.

A second specific example of the network is described in U.S. application Ser. No. 15/803,595 filed Nov. 3, 2017, which is incorporated herein in its entirety by this reference.

In a first variant, training the one or more object detectors can include selecting the network to train based on the training data, based on the object, and/or based on any other suitable information.

In a second variant, training the one or more detectors can include training an object specific neural network to classify whether an object of interest is within an insertion target or not (e.g., a predetermined distance from the insertion target, such as more than 1 mm, more than 5 mm, more than 1 cm, more than 2 cm, etc.), such as for post-insertion inspection. In this variant, the input can be a synthetic image or a real world image of an object inserted into an insertion component and labelled based on the position of the object relative to the insertion component.

However, the one or more object detectors can be otherwise trained.

5.9 Detecting Objects Using the Trained Object Detector S900

Detecting objects using the trained object detector S900 can function to detect objects (e.g., object bounding boxes) and/or object features (e.g., keypoints, and optionally associated object component identifiers) in deployment environments based on sampled images of the scene (e.g., real-world scene). The object and/or feature detections can be used to: select an object to grasp, select a contact (e.g., grasp) point, avoid the detected object or feature, and/or otherwise used.

Deployment environments can include: object grasping environments, object placing environments (e.g., keypoints of an insertion volume), navigation environments (e.g., for autonomous land vehicles; for autonomous water vehicles; for autonomous aircraft; for autonomous robots, such as outdoor or indoor robots; etc.), indoor and/or outdoor scenes, and/or any other suitable deployment environment.

In a first variant, the deployment environment is a physical scene (e.g., a conveyor belt, a container, etc.) that includes one or more objects (e.g., overlapping objects; such as a pile of objects; non overlapping objects, etc.). In a first example, the deployment environment is a pile of multiple different versions of the same object. In a second example, the deployment environment is a pile of multiple different versions of different objects. In a third variant, the deployment environment is a shelving unit, wherein objects can be grasped on a particular shelf of the shelving unit.

In a second variant, the deployment environment is a physical navigation space (e.g., road, side walk, side of the road, etc.).

The detected keypoints output by the trained network can be used to enable: object grasping, object insertion, image stitching by matching the keypoints across different images, navigation (e.g., object avoidance and/or object presence to enable more accurate navigation), and/or any other suitable application. Optionally, the detected keypoints can be used to determine object presence in the image, object location in the image, a graspable point on the detected object, and/or otherwise used. However, objects can be otherwise detected.

In a first variant, detecting objects using the trained object detector can include: capturing an image of a physical scene using an imaging system (e.g., preferably a different imaging system than that used to capture the set of images in S100, but can additionally or alternatively be the same imaging system) proximal the physical scene; and detecting an inference keypoint, associated with an object component identifier, of an object in the physical scene using the trained object detector.

In a second variant, detecting objects using the trained object detector can include capturing an image of a navigation environment using an imaging system; and detecting an inference keypoint, associated with an object component identifier, of an object in the navigation environment using the trained detector, and using the detected inference keypoint to enable more accurate navigation (e.g., object avoidance, steering, etc.). However, the object detector can be otherwise used to detect objects.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method, comprising:
capturing a set of images that depict an object;
segmenting an image of the set of images to determine a volumetric object segment based on back lit images of the object from the set of images;

determining an object mesh based on the volumetric object segment;
determining multiple object faces of the object mesh; and
adding multiple keypoints to each object face of the object mesh, wherein each keypoint is associated with an object face identifier for the respective object face.

2. The method of claim 1, wherein the set of images comprises depth images that depict a silhouette of the object, wherein the depth images comprise surface normals for the keypoints in each image, and the method further comprises determining refined surface normals using a bidirectional reflectance distribution function.

3. The method of claim 2, further comprising rendering a synthetic image using the object mesh and the refined surface normals.

4. The method of claim 2, wherein the set of images comprises a front lit image captured at a same position as the back lit image, and wherein rendering the synthetic image comprises texturing the object mesh using the front lit image.

5. The method of claim 1, further comprising:
generating multiple refined meshes for different sides of the object; and
generating a full mesh by aligning the multiple refined meshes and combining the aligned multiple refined meshes.

6. The method of claim 1, wherein each object face of the multiple object faces is determined based on surface normal continuity of the object mesh, and an object component identifier is assigned to keypoints that lie on the object face.

7. The method of claim 6, wherein the keypoints are placed on each object face to maximize keypoint coverage of the object face.

8. The method of claim 1, wherein the set of images are captured using an image capture environment, wherein the image capture environment comprises a housing that defines a measurement volume, and a first set of light emitting elements configured to front light the measurement volume, and a second set of light emitting elements configured to back light the measurement volume.

9. The method of claim 8, wherein the first set of light emitting elements and the second set of light emitting elements are distributed about an interior of the housing.

10. A system, comprising:
one or more computers and one or more storage devices storing instructions that are operable, when executed by the one or more computers, to cause the one or more computers to perform operations comprising:
capturing a set of images depicting an object;
determining a set of masks based on the set of images;
determining an object mesh based on the set of masks;
determining multiple object faces of the object mesh; and
adding a plurality of keypoints to each object face of the object mesh, wherein each keypoint is associated with an object face identifier for the respective object face.

11. The system of claim 10, further comprising an image capture environment comprising:
a housing defining an enclosed measurement volume;
a pedestal mounted to the housing within the measurement volume and configured to support an object in the measurement volume;
a set of calibration features mounted to the pedestal;
an imaging system configured to capture the set of images;
an imaging system actuator mounting the imaging system and configured to move the imaging system along a predefined trajectory relative to the pedestal; and
a plurality of light emitting elements mounted to the housing, wherein the light emitting elements are distributed about the interior of the housing.

12. The system of claim 11, wherein the plurality of light emitting elements comprises a front and back subset of light emitting elements configured to front-light and back-light the measurement volume, wherein the images captured when the measurement volume is back lit are used to generate the object mesh, and wherein the images that are captured when the measurement volume is front lit are used to render a synthetic image.

13. The system of claim 11, wherein the pedestal rotates during image capture.

14. The system of claim 11, wherein the calibration pattern is mounted to a side of the pedestal.

15. The system of claim 11, wherein the light emitting elements are evenly distributed about the measurement volume.

16. The system of claim 11, wherein the imaging system actuator is configured to actuate the camera to capture a plurality of views of the object, wherein the plurality of views cooperatively form a photo dome of the object.

17. The system of claim 10, wherein the operations further comprise rendering a synthetic image using the object mesh, wherein the synthetic image is rendered using a physics module configured to simulate a scene using multiple instances of the object mesh.

18. The system of claim 17, wherein the synthetic image is associated with unoccluded keypoints from the plurality that are unoccluded in the synthetic image.

19. The system of claim 17, wherein the synthetic image is used as input to train an object detector to identify unoccluded object keypoints in the synthetic image.

20. The system of claim 10, wherein the set of images comprises a back lit image, and wherein the set of masks is determined based on the back lit image.

21. The method of claim 1, further comprising training an object detector using synthetic images and the generated keypoints as training data.

22. The system of claim 10, wherein the operations further comprise training an object detector using synthetic images and the generated keypoints as training data.

* * * * *